United States Patent
Oka et al.

(10) Patent No.: US 8,692,966 B2
(45) Date of Patent: Apr. 8, 2014

(54) LIQUID CRYSTAL DISPLAY DEVICE

(75) Inventors: Shinichiro Oka, Hitachi (JP); Shinichi Komura, Mobara (JP); Hirotaka Imayama, Mobara (JP); Takeshi Sato, Mobara (JP); Osamu Itou, Hitachi (JP)

(73) Assignees: Japan Display Inc., Tokyo (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 786 days.

(21) Appl. No.: 12/785,750

(22) Filed: May 24, 2010

(65) Prior Publication Data

US 2010/0309419 A1  Dec. 9, 2010

(30) Foreign Application Priority Data

Jun. 5, 2009  (JP) ................................. 2009-135743

(51) Int. Cl.
*G02F 1/1333* (2006.01)
*G02F 1/1343* (2006.01)

(52) U.S. Cl.
USPC ............................. 349/141; 349/138; 349/143

(58) Field of Classification Search
USPC .......................................... 349/141, 143, 138
See application file for complete search history.

(56) References Cited

U.S. PATENT DOCUMENTS

| | | | | |
|---|---|---|---|---|
| 7,940,359 | B2 * | 5/2011 | Lee | 349/138 |
| 2001/0040661 | A1 * | 11/2001 | Ohta et al. | 349/141 |
| 2002/0008828 | A1 * | 1/2002 | Park et al. | 349/141 |
| 2003/0020862 | A1 * | 1/2003 | Ohta et al. | 349/141 |
| 2005/0084623 | A1 * | 4/2005 | Ohe et al. | 428/1.3 |
| 2005/0280760 | A1 * | 12/2005 | Lyu et al. | 349/119 |
| 2008/0100787 | A1 * | 5/2008 | Segawa et al. | 349/141 |
| 2008/0303376 | A1 * | 12/2008 | Jakli et al. | 310/311 |
| 2012/0069287 | A1 * | 3/2012 | Lyu et al. | 349/155 |

FOREIGN PATENT DOCUMENTS

| | | |
|---|---|---|
| GB | 2 387 603 | 10/2003 |
| JP | 07-020440 | 1/1995 |
| JP | 2003-206485 | 7/2003 |

OTHER PUBLICATIONS

Taiju Takahashi et al., Novel Measurement Method for Flexoelectric Coefficients of Nematic Liquid Crystals, Japanese Journal of Applied Physics, Apr. 1998, pp. 1865-1869, vol. 37, Part 1, No. 4A.

E. K. Tidey et al., Determination of the difference of flexoelectric coefficients in a namatic liquid crystal using a conoscopic technique, Taylor & Francis, Liquid Crystal, Feb. 2007, pp. 251-255, vol. 34, No. 2.

(Continued)

*Primary Examiner* — Edward Glick
*Assistant Examiner* — Dennis Y Kim
(74) *Attorney, Agent, or Firm* — Antonelli, Terry, Stout & Kraus, LLP.

(57) ABSTRACT

Provided is a liquid crystal display device including: a first substrate; a second substrate; a liquid crystal layer sandwiched between the first and the second substrates; a first polarization plate placed on a side of the first substrate; a second polarization plate placed on a side of the second substrate; and a pixel electrode and a common electrode which are provided on the side of the second substrate on which the liquid crystal layer is placed, in which: at least one of the pixel electrode and the common electrode is interdigital; and the liquid crystal layer has flexoelectric coefficients $e_{11}$ and $e_{33}$, both absolute values of which are +7 pC/m or less. Accordingly, a flicker intensity in an IPS liquid crystal display device is suppressed to such a degree as not to influence display quality.

5 Claims, 26 Drawing Sheets

(56) References Cited

OTHER PUBLICATIONS

Darren R. Link et al., Flexoelectric polarization in hybrid nematic films, The American Physical Society, 2001, Physical Review E, pp. 010701-1-4, vol. 65.

S. H. Lee et al., Electro-optic characteristics and switching principle of a nematic liquid crystal cell controlled by fringe-field switching, Applied Physics Letters, Nov. 16, 1998, pp. 2881-2883, vol. 73, No. 20.

* cited by examiner

FIG.2
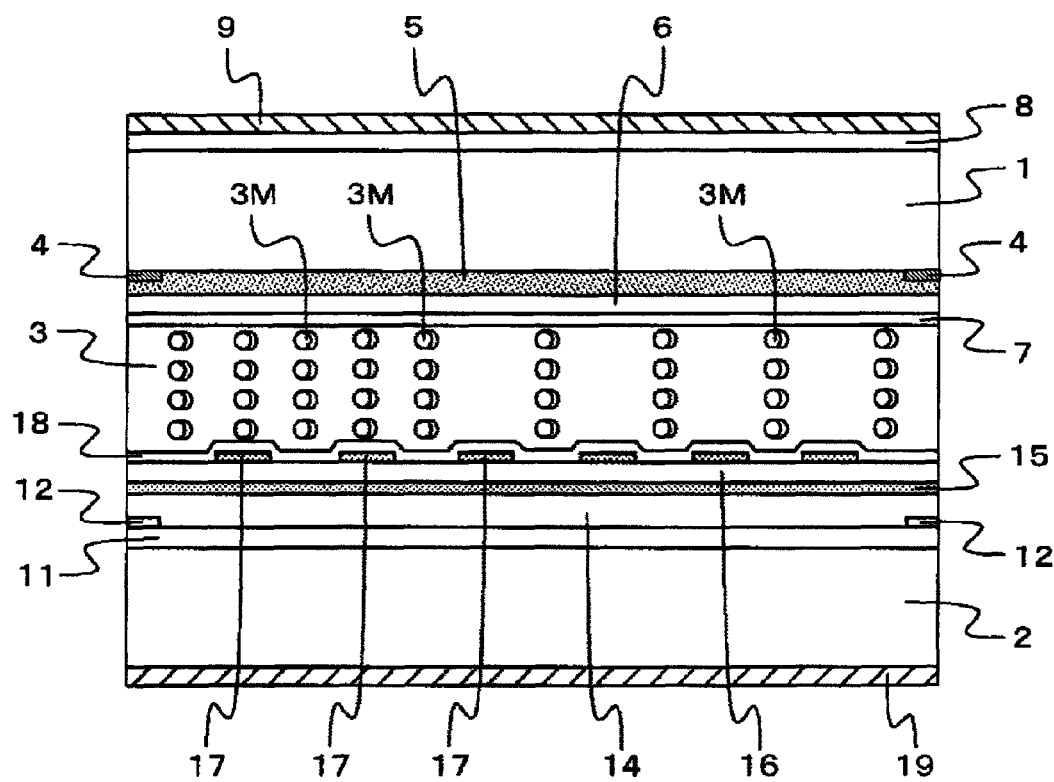
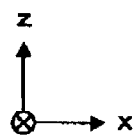

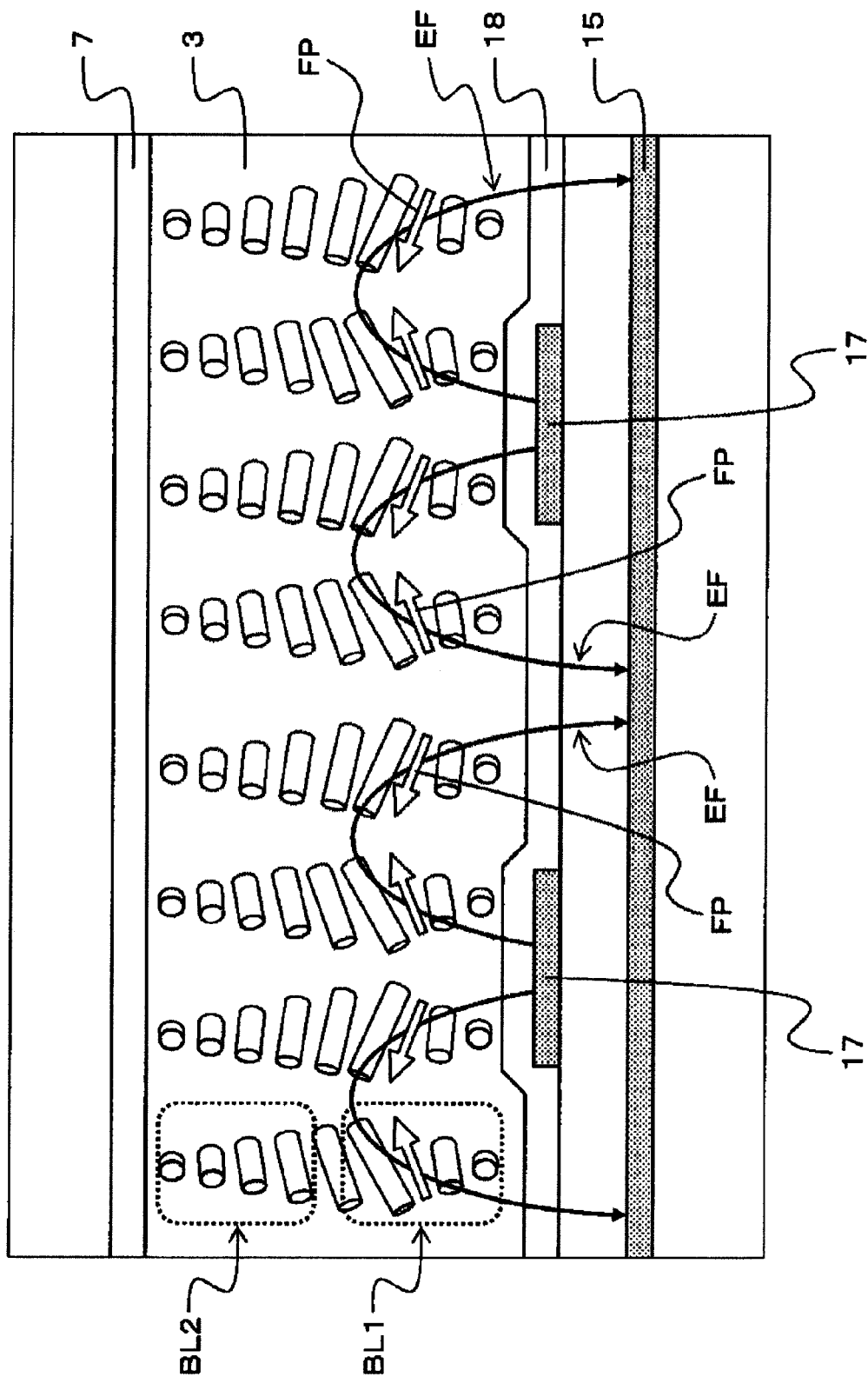

LIQUID CRYSTAL DISPLAY DEVICE

CROSS-REFERENCE TO RELATED APPLICATION

The present application claims priority from Japanese patent application JP 2009-135743 filed on Jun. 5, 2009, the content of which is hereby incorporated by reference into this application.

BACKGROUND OF THE INVENTION

1. Field of the Invention

The present invention relates to a liquid crystal display device, and in particular, a technology effective for being applied to an in-plane switching (IPS) liquid crystal display device.

2. Description of the Related Art

Unlike a self-emitting display device, for example a cathode ray tube (CRT) or a plasma display panel (PDP), a liquid crystal display device is a non-self-emitting display device that displays a video or an image by regulating a transmitted amount of light from a light source or a reflected amount of external light, or the amounts of both the light.

Further, the liquid crystal display device has features such as thinness, light weight, and lower power consumption, and, in recent years, has been used widely in a liquid crystal display for a liquid crystal television or a personal computer, a liquid crystal display for a portable electronic appliance such as a portable telephone terminal, and the like.

The liquid crystal display device includes a liquid crystal display panel, and a driving circuit for driving the liquid crystal display panel. The liquid crystal display panel has a configuration in which a liquid crystal material is sealed between a pair of substrates, and has a display region formed of a large number of pixels. Each pixel includes a pixel electrode, a common electrode, and a liquid crystal layer, and the transmitted light amount or the reflected light amount, or the amounts of both the light are regulated by varying the alignment of a liquid crystal layer (liquid crystal molecules) with a potential difference between the pixel electrode and the common electrode. Further, the arrangement of the pixel electrodes and the common electrode is roughly classified into the case where the pixel electrodes and the common electrode are placed on different substrates and the case where the pixel electrodes and the common electrode are placed on the same substrate.

A liquid crystal display panel in which the pixel electrodes and the common electrode are placed on the same substrate is generally called an IPS system, and an effective optical axis is rotated in a plane by rotating liquid crystal molecules in an in-plane direction, to thereby regulate the transmitted light amount or the reflected light amount, or the amounts of both the light. In the liquid crystal display device having an IPS liquid crystal display panel, an alignment direction of the liquid crystal layer is substantially horizontal, and hence, a change in retardation of the liquid crystal layer due to a change in a viewing angle is small. Therefore, it is known that the IPS liquid crystal display device can achieve a wide viewing angle.

The arrangement of pixel electrodes and a common electrode in the IPS liquid crystal display panel is roughly classified into the arrangement in which the pixel electrodes and the common electrode are opposed to each other on a same side of an insulating layer and the arrangement in which the pixel electrodes and the common electrode are laminated separately via an insulating layer. In the case where the pixel electrodes and the common electrode are placed on the same side of the insulating layer, the plane shape of each of the pixel electrodes and the plane shape of the common electrode are rendered interdigital, and the pixel electrodes and the common electrode are arranged, for example, in such a manner that tooth portions of the pixel electrodes and tooth portions of the common electrode are placed alternately. On the other hand, in the method of laminating the pixel electrodes and the common electrode, for example, the plane shape of electrodes closer to the liquid crystal layer is formed in an interdigital shape and the plane shape of the other electrodes is formed in a flat plate shape.

In a liquid crystal display device such as a liquid crystal television or a liquid crystal display, generally, the sign of a potential difference between the pixel electrodes and the common electrode varies ever frame period or every predetermined number frame periods. Therefore, in a conventional liquid crystal display device, an in-plane distribution of a transmittance varies, for example, between the case where a positive voltage is applied to the pixel electrodes and the case where a negative voltage is applied thereto, and thus, a phenomenon called flicker occurs. Here, the positive voltage refers to the case where the potential of the pixel electrodes is higher than that of the common electrode, and the negative voltage refers to the case where the potential of the pixel electrodes is lower than that of the common electrode.

One of factors for the occurrence of flicker is as follows: when a thin film transistor (TFT) element is switched from on to off, an abnormal voltage is applied to the potential of the pixel electrode due to parasitic capacitance of the TFT, and a direct current voltage component (DC voltage component) is generated in the potential of the pixel electrode. Therefore, in the conventional liquid crystal display device, a fluctuation portion of the potential of the pixel electrode generated due to parasitic capacitance, i.e., a component for canceling a DC voltage component (hereinafter, referred to as a "DC offset voltage") is applied to a gray level voltage to be applied to the pixel electrode, to thereby suppress flicker (see, for example, JP 07-020440 A).

SUMMARY OF THE INVENTION

In the case where a DC offset voltage is applied to a gray level voltage in the IPS liquid crystal display device, when a flicker intensity with respect to the DC offset voltage is measured, the flicker intensity takes a minimum value at a certain DC offset voltage.

However, in the conventional IPS liquid crystal display device, even if the DC offset voltage is set so that the flicker intensity becomes a minimum value, the flicker intensity does not become zero in most cases.

In is an object of the present invention to provide a technology capable of suppressing a flicker intensity in an in-plane switching (IPS) liquid crystal display device to such a degree as not to influence display quality.

It is another object of the present invention to provide a technology capable of easily decreasing the flicker intensity in the IPS liquid crystal display device.

The above-mentioned and other objects and new features of the present invention become apparent with reference to the description of this specification and the accompanying drawings.

Among aspects of the invention disclosed in this application, the outline of the typical ones is described as follows.

(1) A liquid crystal display device, including: a first substrate; a second substrate; a liquid crystal layer sandwiched between the first substrate and the second substrate; a first polarization plate placed on a side opposite to a side of the first substrate on which the liquid crystal layer is placed; a second polarization plate placed on a side opposite to a side of the second substrate on which the liquid crystal layer is placed; and a pixel electrode and a common electrode which are provided on the side of the second substrate on which the liquid crystal layer is placed, in which: at least one of the pixel electrode and the common electrode is interdigital; and the liquid crystal layer has flexoelectric coefficients $e_{11}$ and $e_{33}$, both absolute values of which are +7 pC/m or less.

(2) The liquid crystal display device according to item (1), in which the liquid crystal layer has elastic constants $K_{11}$ and $K_{33}$, both of which are 13 pN or more.

(3) The liquid crystal display device according to item (1), in which the liquid crystal layer has elastic constants $K_{11}$ and $K_{33}$, both of which are 16 pN or more.

(4) The liquid crystal display device according to item (1), in which: the pixel electrode and the common electrode are laminated via an insulating layer; one of the pixel electrode and the common electrode which is closer to the liquid crystal layer is interdigital; and assuming that a number of teeth of the one of the pixel electrode and the common electrode which is closer to the liquid crystal layer is u, the following relationship of Mathematical Equation 1 is satisfied between a dielectric anisotropy $\Delta\epsilon$ of the liquid crystal layer and the number of teeth u.

$$\Delta\varepsilon \leq \frac{7.5}{-0.36 \times \log_e(u) + 1.49} \quad (1)$$

(5) The liquid crystal display device according to item (1), in which: the pixel electrode and the common electrode are laminated via an insulating layer; one of the pixel electrode and the common electrode which is closer to the liquid crystal layer is interdigital; and the liquid crystal display device further includes a dielectric cap having a permittivity lower than a permittivity of the liquid crystal layer, the dielectric cap being provided between an outer peripheral portion of the one of the pixel electrode and the common electrode which is closer to the liquid crystal layer and the liquid crystal layer.

(6) The liquid crystal display device according to item (5), in which one of the pixel electrode and the common electrode which is closer to the liquid crystal layer and the dielectric cap have an overlapped region with an area of 10% or more and less than 90% with respect to an area of the one of the pixel electrode and the common electrode which is closer to the liquid crystal layer.

(7) The liquid crystal display device according to item (1), in which the liquid crystal layer has a polar anchoring strength at an interface on the side of the first substrate, which is smaller than a polar anchoring strength at an interface on the side of the second substrate.

(8) The liquid crystal display device according to item (1), in which: the pixel electrode and the common electrode are laminated via an insulating layer; one of the pixel electrode and the common electrode which is closer to the liquid crystal layer is interdigital; and assuming that a width of teeth of the one of the pixel electrode and the common electrode which is closer to the liquid crystal layer is L and a gap of the teeth is S, $0.3 \leq L/(L+S) \leq 0.5$ is satisfied.

(9) A liquid crystal display device, including: a first substrate; a second substrate; a liquid crystal layer sandwiched between the first substrate and the second substrate; a first polarization plate placed on a side opposite to a side of the first substrate on which the liquid crystal layer is placed; a second polarization plate placed on a side opposite to a side of the second substrate on which the liquid crystal layer is placed; and a pixel electrode and a common electrode which are laminated via an insulating layer, the pixel electrode and the common electrode being provided on the side of the second substrate on which the liquid crystal layer is placed, in which: one of the pixel electrode and the common electrode which is closer to the liquid crystal layer is interdigital; a relationship between a potential of the pixel electrode and a potential of the common electrode is inverted on a predetermined number flame period basis; and assuming that a number of teeth of the one of the pixel electrode and the common electrode which is closer to the liquid crystal layer is u, a transmittance fluctuation rate TPP1 on the teeth and a transmittance fluctuation rate TPP2 on a gap portion of the teeth respectively satisfy the following relationships of Mathematical Equations 2 and 3.

$$TPP1 \geq 81 \times \log_e(u) - 44 \quad (2)$$

$$TPP2 \geq 20 \times \log_e(u) + 7 \quad (3)$$

(10) The liquid crystal display device according to item (9), in which the liquid crystal layer has a dielectric anisotropy of a positive value.

(11) The liquid crystal display device according to item (9), in which the liquid crystal layer has a dielectric anisotropy of a negative value.

According to the liquid crystal display device of the present invention, a flicker intensity can be suppressed to such a degree as not to influence display quality.

Further, according to the liquid crystal display device of the present invention, the flicker intensity can be decreased easily.

BRIEF DESCRIPTION OF THE DRAWINGS

In the accompanying drawings:

FIG. 2 is a schematic cross-sectional view illustrating an example of a cross-sectional configuration taken along the line A-A of FIG. 1;

FIG. 9 is a schematic cross-sectional view illustrating an example of a relationship between an electric field generated in a liquid crystal display panel and flexoelectric polarization;

DETAILED DESCRIPTION OF THE INVENTION

Hereinafter, the present invention is described in detail by way of an embodiment (examples) with reference to the drawings.

In the entire figures illustrating the examples, elements having the same functions are denoted with the same reference symbols, and the repeated descriptions thereof are omitted.

FIGS. 1 to 5 are schematic views illustrating an example of a schematic configuration of a liquid crystal display panel according to the present invention.

Figure 1:
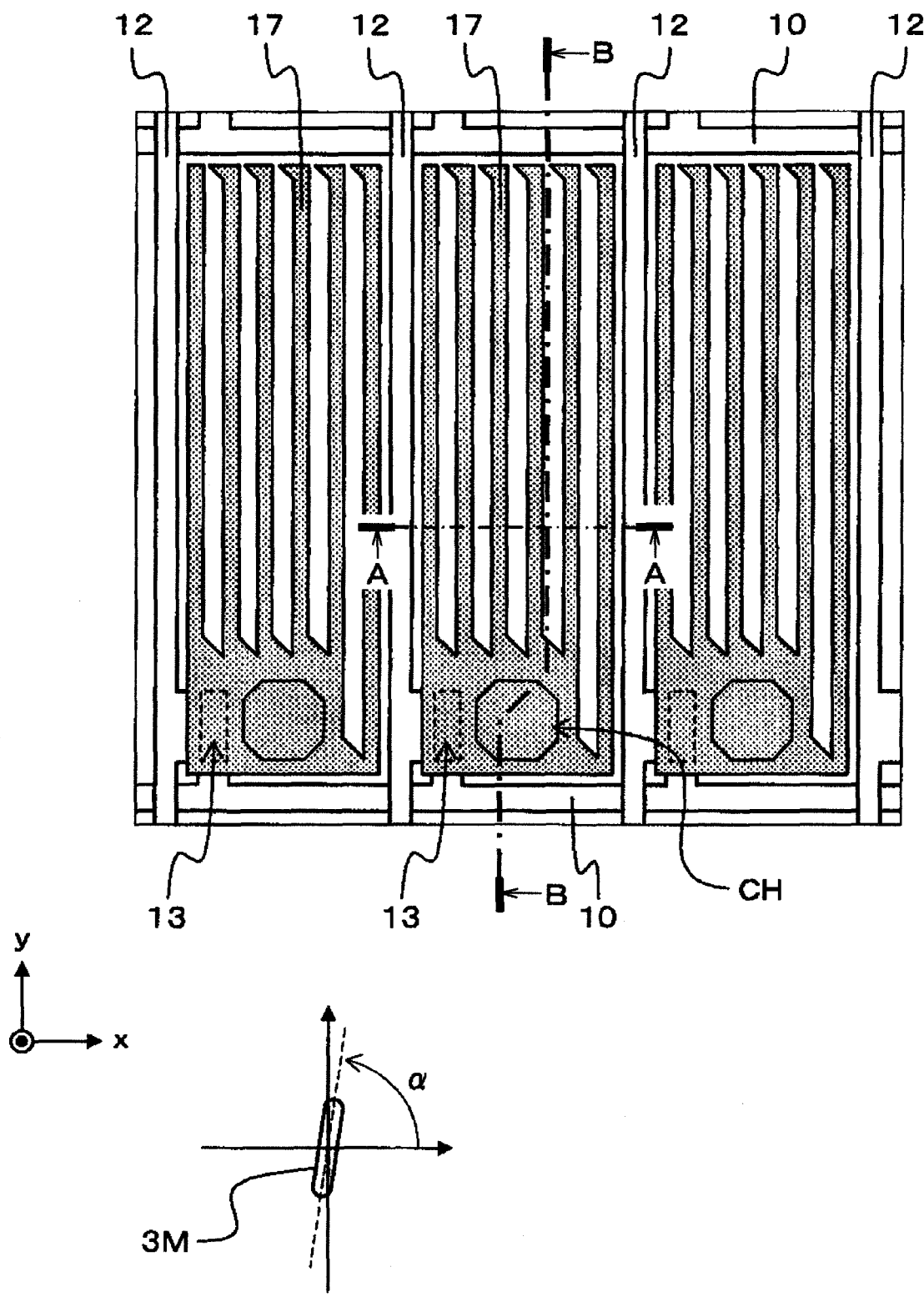
FIG. 1 is a schematic plan view illustrating an example of a plane configuration of a pixel in a liquid crystal display panel according to the present invention.
Figure 3:
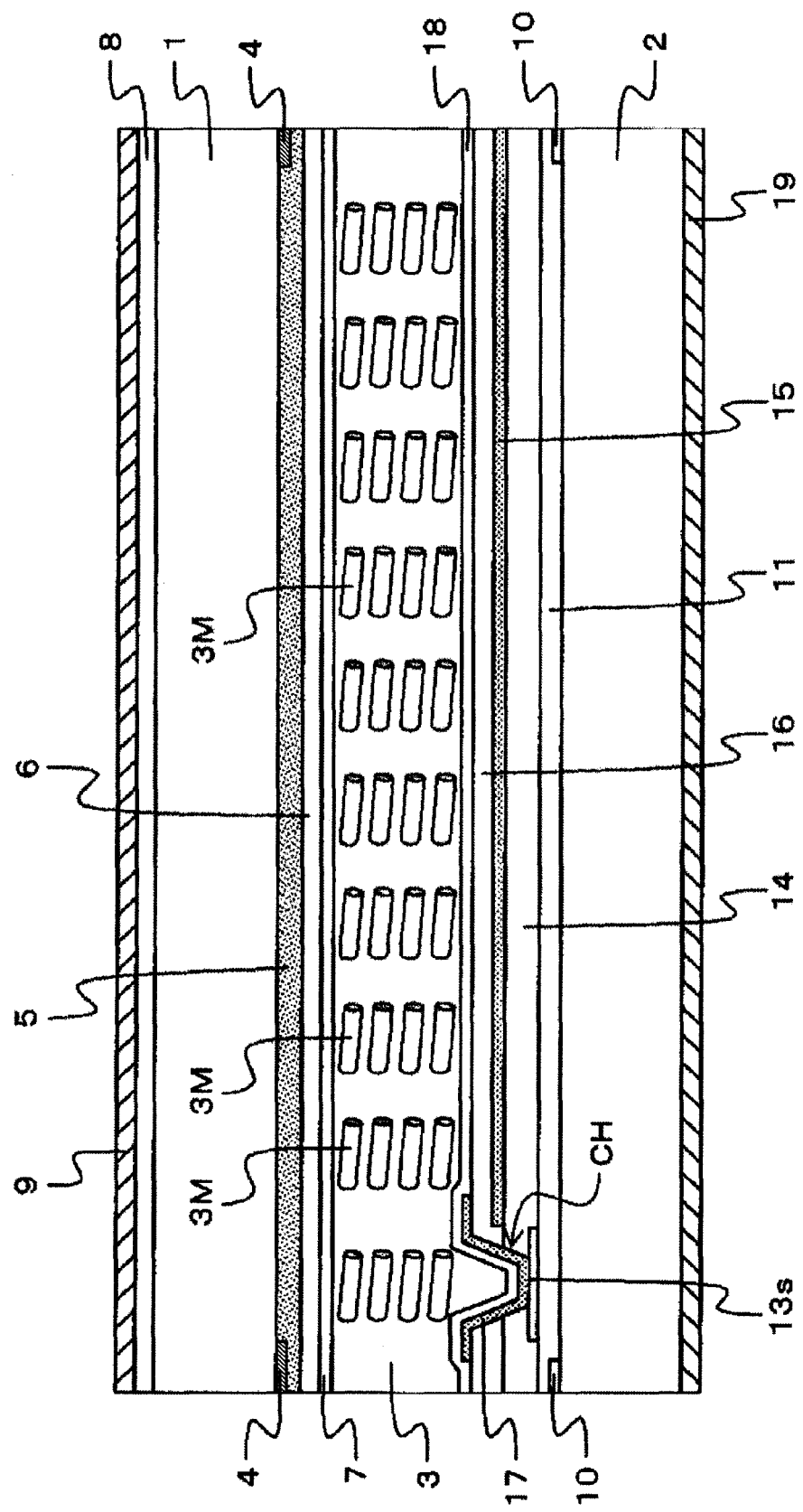
FIG. 3 is a schematic cross-sectional view illustrating an example of a cross-sectional configuration taken along the line B-B of FIG. 1.
Figure 4:
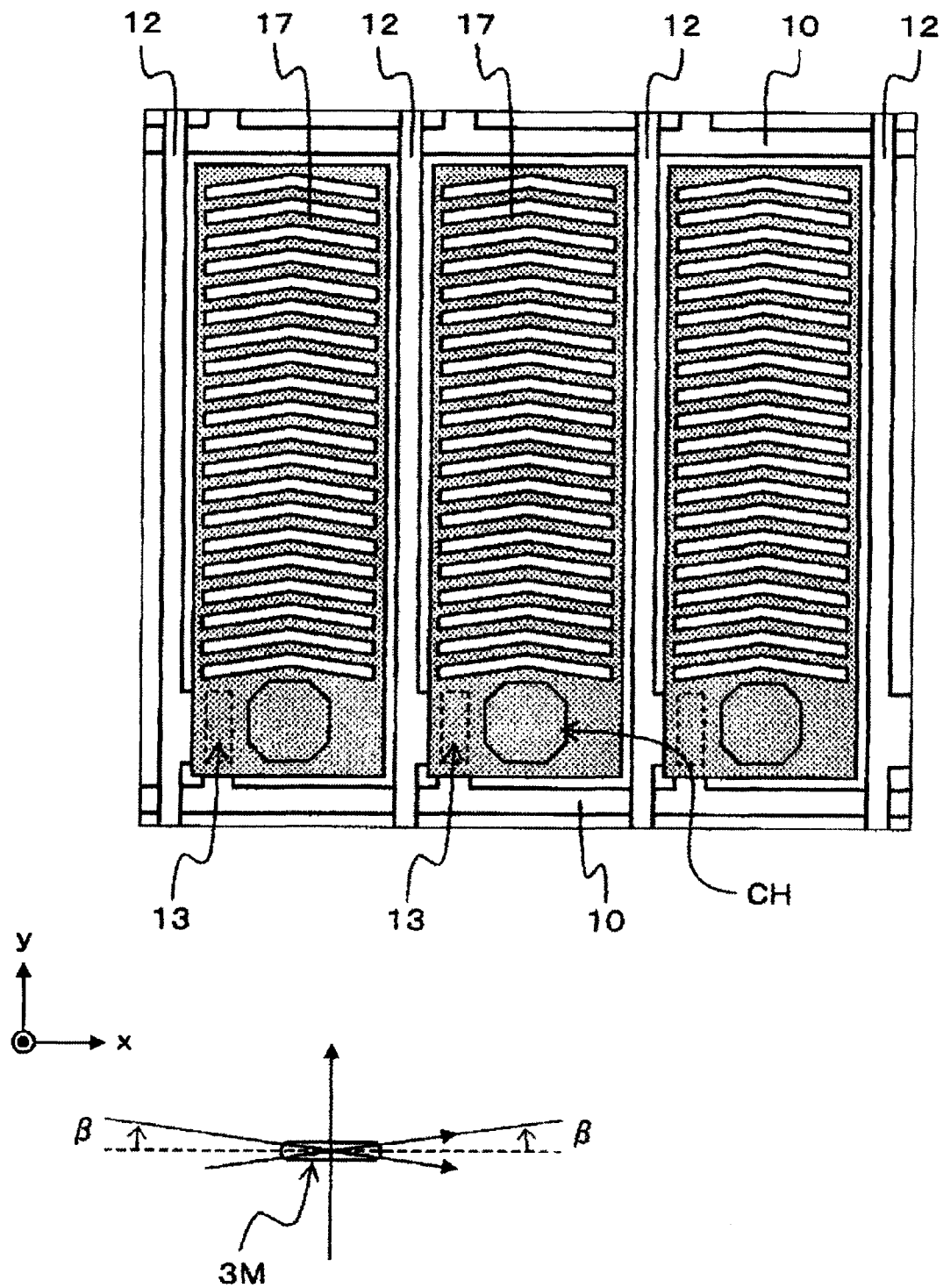
FIG. 4 is a schematic plan view illustrating a first modified example regarding a plane shape of a pixel electrode.
Figure 5:
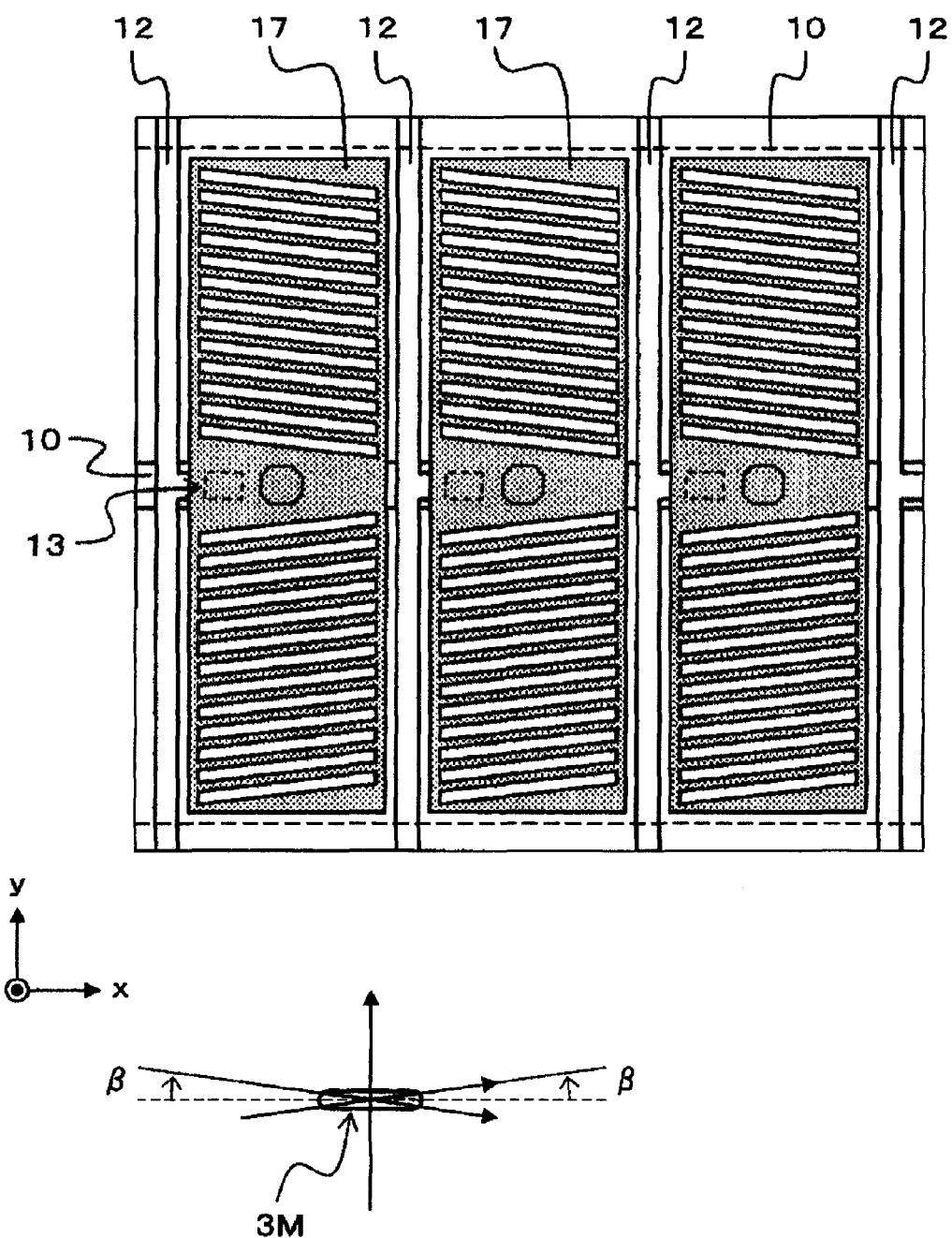
FIG. 5 is a schematic plan view illustrating a second modified example regarding the plane shape of the pixel electrode.

FIG. 1 is a schematic plan view illustrating an example of a plane configuration of pixels in a liquid crystal display panel according to the present invention. FIG. 2 is a schematic cross-sectional view illustrating an example of a cross-sectional configuration taken along the line A-A of FIG. 1. FIG. 3 is a schematic cross-sectional view illustrating an example of a cross-sectional configuration taken along the line B-B of FIG. 1. FIG. 4 is a schematic plan view illustrating a first modified example regarding a plane shape of pixel electrodes. FIG. 5 is a schematic plan view illustrating a second modified example regarding a plane shape of the pixel electrodes.

An object of the present invention is to decrease a flicker intensity in an IPS liquid crystal display device as described above. A liquid crystal display device includes a liquid crystal display panel and a driving circuit for driving the liquid crystal display panel. In the case where the liquid crystal display device is a transmission type, the liquid crystal display device also has an illuminating device (backlight unit) in addition to the liquid crystal display panel and the driving circuit.

Further, the present invention relates to a configuration of the liquid crystal display panel in the liquid crystal display device. The liquid crystal display panel has a configuration in which a liquid crystal material is sealed between a first substrate and a second substrate, and has a display region including a large number of pixels. Each of the pixels includes, for example, a TFT element, a pixel electrode, a common electrode, and a liquid crystal layer. In the case of the IPS system, each pixel is configured, for example, as illustrated in FIGS. 1 to 3.

A first substrate 1 and a second substrate 2 are excellent, for example, in transparency and flatness, and are formed of borosilicate glass containing less ionic impurities.

On the first substrate 1, a black matrix 4, a color filter 5, a flattening film 6, and a first alignment film 7 are formed on a surface opposed to a liquid crystal layer 3 (and the second substrate 2). Further, on the first substrate 1, an antistatic reverse electrode 8 is formed on a surface opposite to the surface opposed to the liquid crystal layer 3, and a first polarization plate 9 is attached to the reverse electrode 8.

On the second substrate 2, scan lines 10, a first insulating layer 11, signal lines 12, a semiconductor layer of TFT elements 13, source electrodes 13s of the TFT elements 13, a second insulating layer 14, a common electrode 15, a third insulating layer 16, pixel electrodes 17, and a second alignment film 18 are formed on a surface opposed to the liquid crystal layer 3 (and the first substrate 1). Further, on the second substrate 2, a second polarization plate 19 is attached to a surface opposite to the surface opposed to the liquid crystal layer 3.

In this case, the pixel electrodes 17 are closer to the liquid crystal layer 3, compared with the common electrode 15, and hence the plane shape of the pixel electrodes 17 has an interdigital shape. Each pixel electrode 17 is connected to the source electrode 13s via a contact hole CH. In one example of the plane configuration illustrated in FIG. 1, one pixel electrode 17 has 6 elongated portions (hereinafter, referred to as teeth) extending in a y-direction, and the 6 teeth are arranged in an x-direction. Further, the common electrode 15 is shared by a plurality of pixels. The common electrode 15 is placed at a position farther from the liquid crystal layer 3, compared with the pixel electrodes 17, and hence, has a plate-shaped or band-shaped plane. The liquid crystal layer 3 is formed of, for example, a liquid crystal material with positive refractive index anisotropy. In this case, when an electric field is not applied to the liquid crystal layer 3, more specifically, when a potential difference between the pixel electrodes and the common electrode is zero, liquid crystal in the liquid crystal layer 3 is homogeneously aligned.

In the case where the extending directions of the teeth portions of the pixel electrodes 17 are substantially parallel to the extending direction (y-direction) of the signal lines 12 as illustrated in FIG. 1, it is desired that the alignment direction of liquid crystal molecules 3M in a plane parallel to the substrate plane is in a direction in which an angle α formed with respect to the extending direction of the scan lines 10 is about 82.5 degrees. Further, it is desired that the liquid crystal molecules 3M be aligned while tilting in a direction perpendicular to the substrate plane at several degrees as illustrated in FIG. 3. The alignment direction of the liquid crystal molecules 3M can be controlled by alignment process (rubbing process) performed with respect to the first alignment film 7 and the second alignment film 18.

The configuration of the pixel illustrated in FIGS. 1 to 3 is an exemplary configuration of a liquid crystal display device of a system called, particularly, an IPS-Provectus (IPS-Pro) system in the IPS liquid crystal display devices. In the liquid crystal display panel according to the present invention, a method of forming the black matrix 4 on the first substrate 1 and a method of forming the scan lines 10 on the second substrate 2 may be any of the formation methods applied in the conventional IPS-Pro liquid crystal display panel. Therefore, in the present specification, the details regarding the configuration of a liquid crystal display panel and a formation method are omitted.

In the case of the IPS-Pro liquid crystal display panel, the plane shape of the pixel electrodes 17 is not limited to the shape illustrated in FIG. 1 and may be, for example, an interdigital shape in which a plurality of teeth are arranged in the extending direction of the scan lines 10 as illustrated in FIG. 4 or 5.

In the pixel electrodes 17 illustrated in FIG. 4, a plurality of slits in a substantially boomerang shape are formed in plate-shaped electrodes. In this case, one pixel electrode 17 includes a first region in which the extending direction of the slits (teeth) with respect to the x-direction tilts by an angle β in a counterclockwise direction and a second region in which the extending direction tilts at an angle β in the clockwise direction, and the two regions are arranged in the x-direction.

On the other hand, the pixel electrodes 17 illustrated in FIG. 5 include a first region in which a plurality of slits (teeth) extending in the first direction and a second region in which a plurality of slits (teeth) extending in the second direction inside the plate-shaped electrodes, and the two regions are arranged in the y-direction.

For example, in the case of providing the pixel electrodes 17 in the shape illustrated in FIGS. 4 and 5, when an electric field is not applied to the liquid crystal molecules 3M, the alignment direction of the liquid crystal molecules 3M becomes substantially parallel to the extending direction (x-direction) of the scan lines 10. Then, when an electric field is applied to the liquid crystal molecules 3M, the alignment direction of the liquid crystal molecules 3M in the first region and the alignment direction of the liquid crystal molecules 3M in the second region are rotated in opposite directions to each other. More specifically, in the case where the alignment direction of the liquid crystal molecules 3M in one region rotates in a clockwise direction, the alignment direction of the liquid crystal molecules 3M in another region rotates in a counterclockwise direction. In this case, when a pixel is seen from a certain viewing angle direction, a region that looks yellow compared with the color displayed by the pixel and a region that looks light blue compared with the color displayed by the pixel are generated in the pixel, and those regions are observed by human eyes in such a manner that they overlap each other. Therefore, the fluctuation of color in that viewing angle is reduced. Thus, in the liquid crystal display device including the pixel electrodes 17 as describe above, even in the case where the viewing angle direction is different from the direction perpendicular to the substrate plane, when the display screen is seen from the viewing angle direction, the pixel is prevented from looking fluctuated from the color displayed by the pixel, and the viewing angle in an allowable color reproduction range is ensured more widely.

FIGS. 6 to 14C are schematic views illustrating one problem in a conventional liquid crystal display device.

Figure 6:
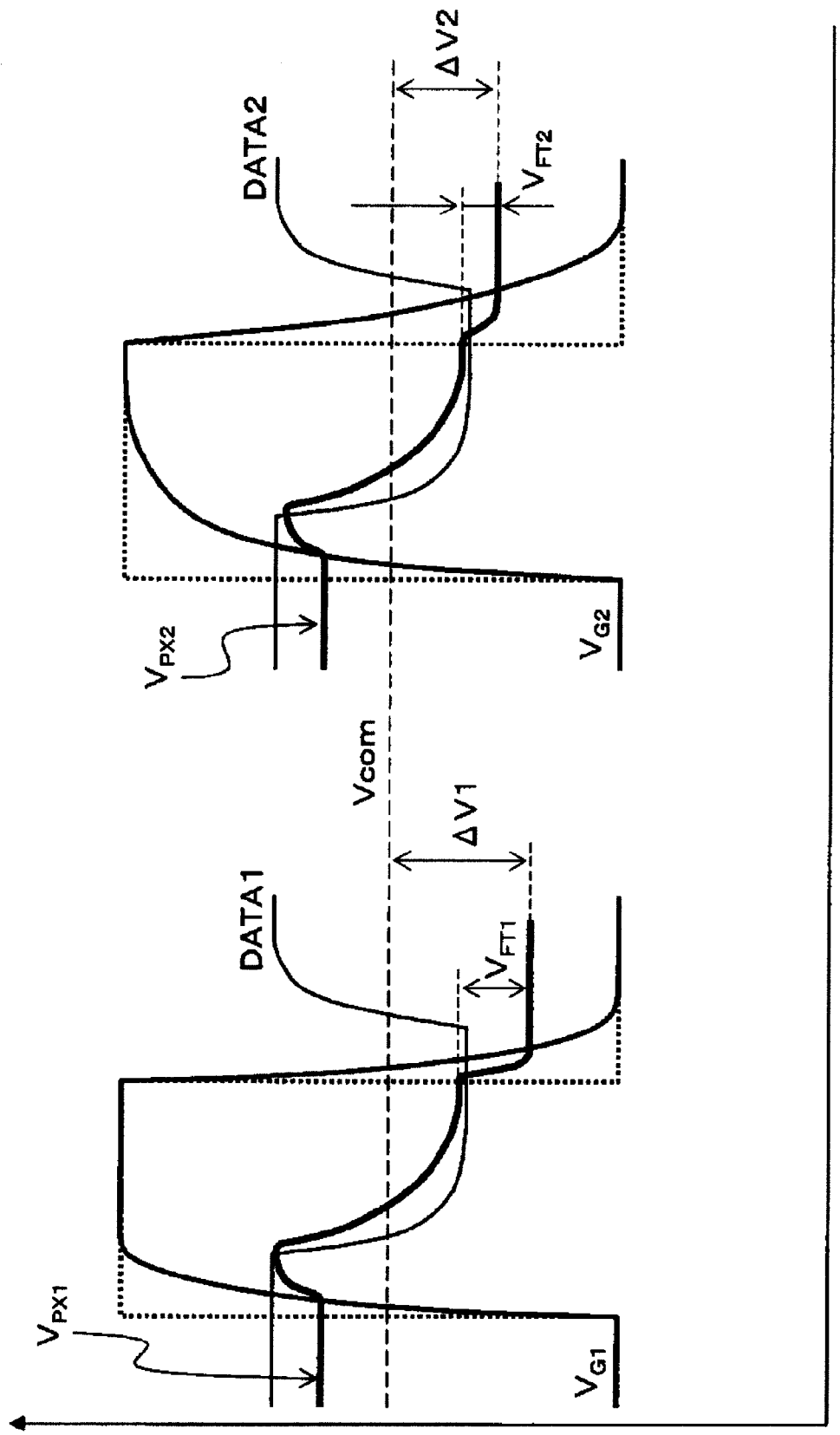
FIG. 6 is a schematic view illustrating an example of a state of a fluctuation of a potential of pixel electrodes in two pixels at different distances from a signal input terminal of a scan line.

FIG. 6 is a schematic view illustrating an example of a state of fluctuation of a potential of pixel electrodes in two pixels at different distances from a signal input terminal of a scan line.

Figure 7:
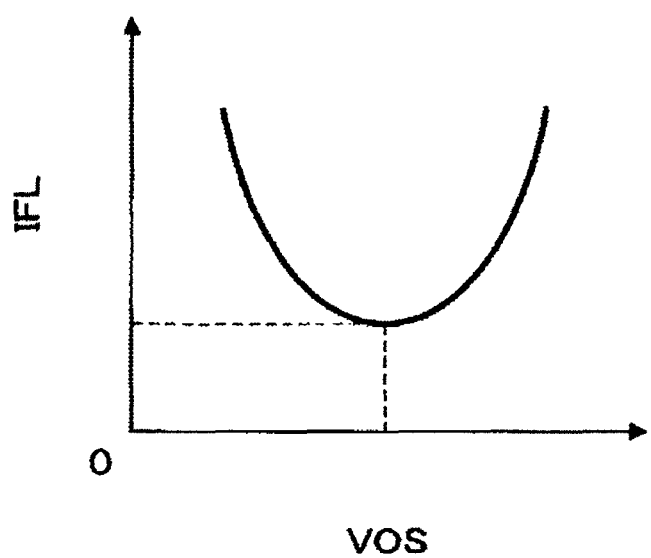
FIG. 7 is a schematic view illustrating an example of a relationship between a DC offset voltage and a flicker intensity.
Figure 8A:
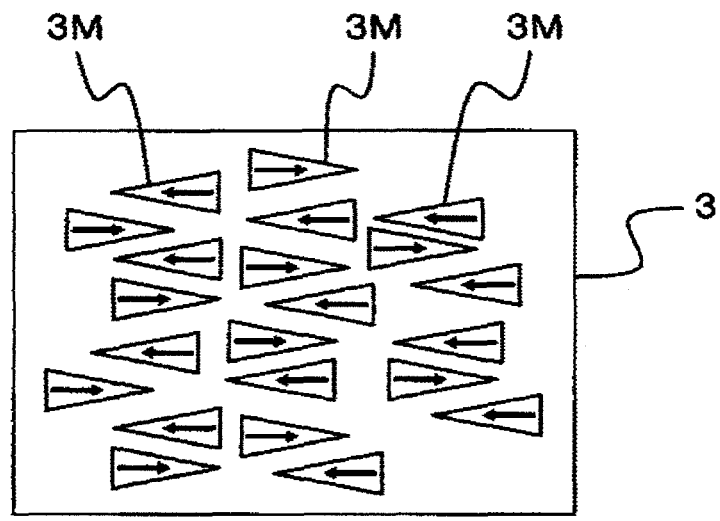
FIG. 8A is a schematic view illustrating an example of a relationship between alignment of a liquid crystal layer and flexoelectric polarization.
Figure 8B:
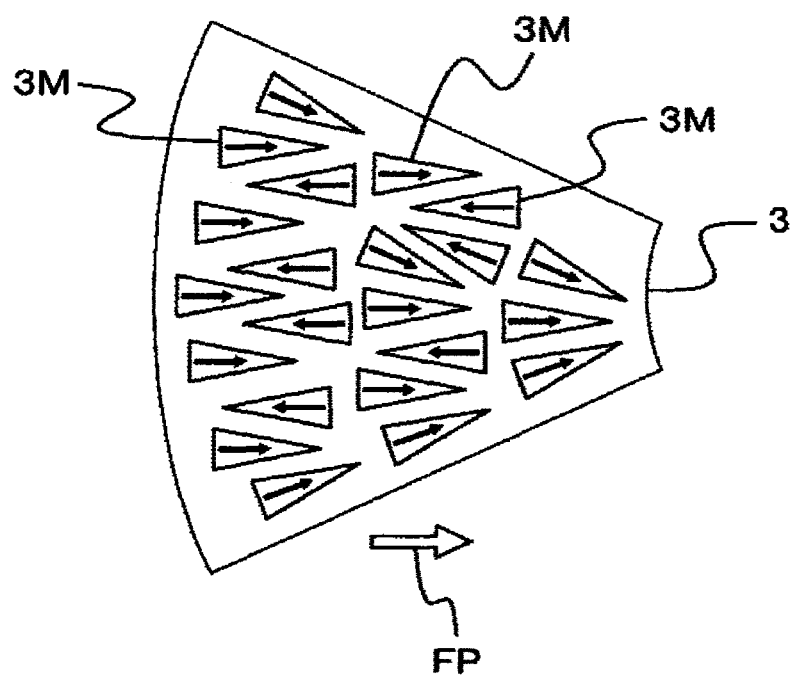
FIG. 8B is a schematic view illustrating another example of the relationship between the alignment of the liquid crystal layer and the flexoelectric polarization.
Figure 10A:
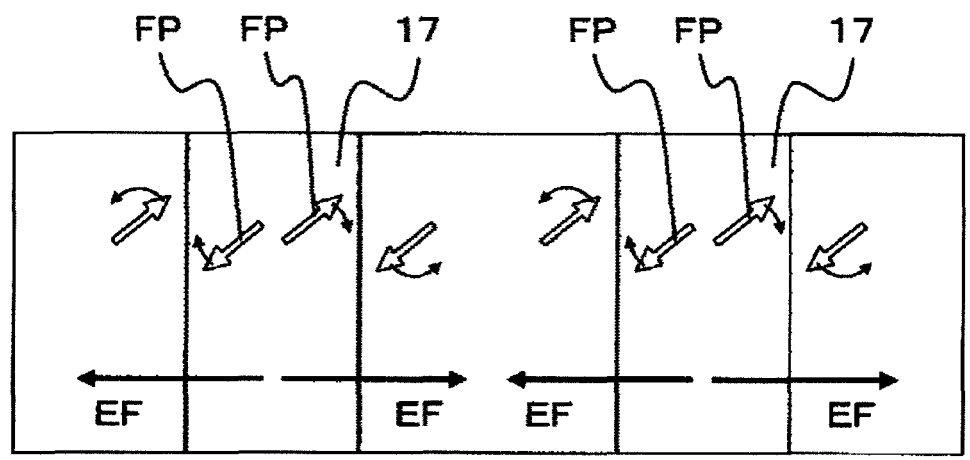
FIG. 10A is a schematic plan view illustrating an example of a relationship between the flexoelectric polarization and the alignment of liquid crystal molecules.
Figure 10B:
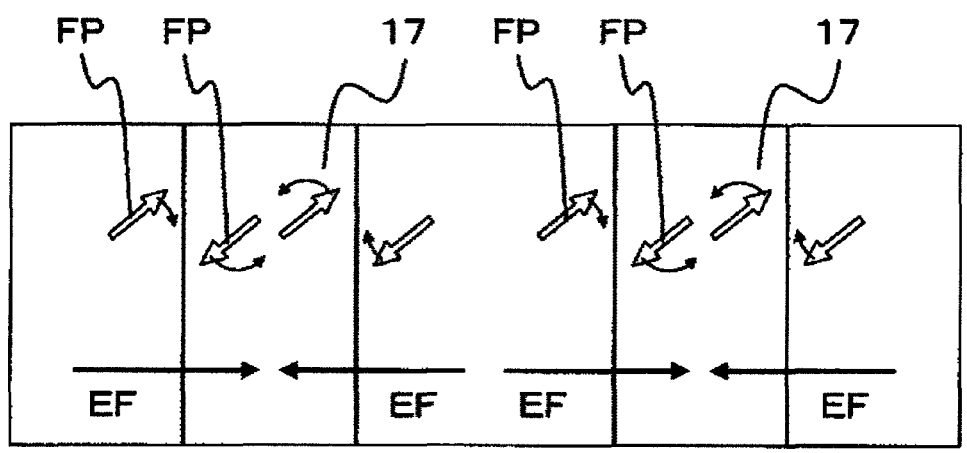
FIG. 10B is a schematic plan view illustrating another example of the relationship between the flexoelectric polarization and the alignment of liquid crystal molecules.
Figure 11:
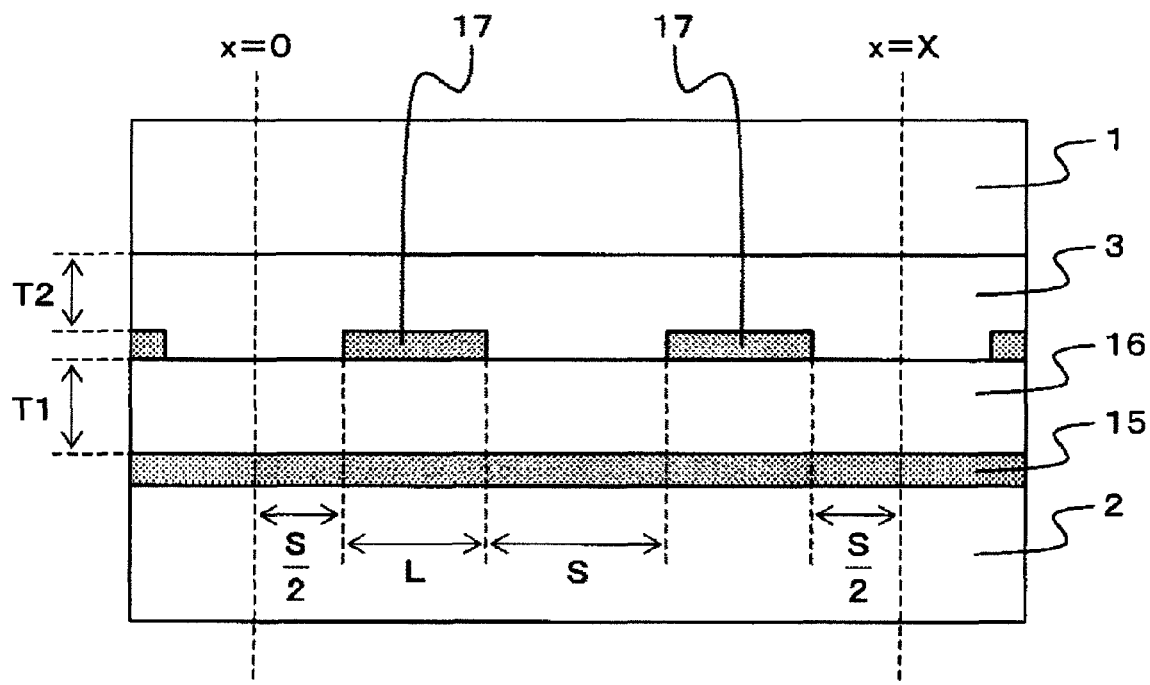
FIG. 11 is a schematic cross-sectional view illustrating a model of a pixel structure for investigating a change in alignment of a liquid crystal layer in the flexoelectric polarization.
Figure 12A:
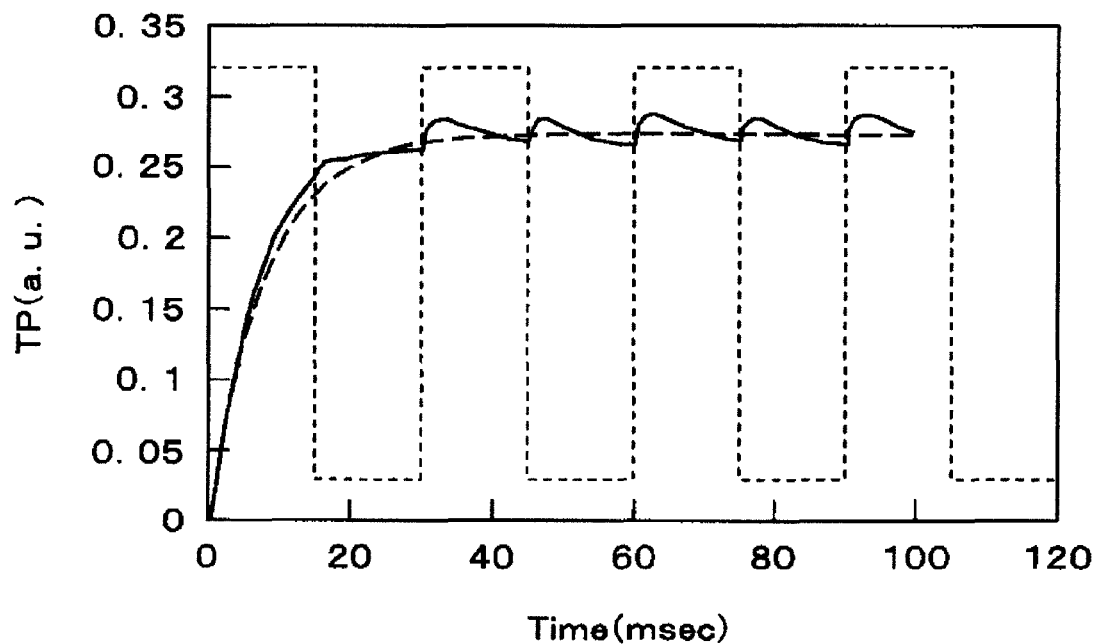
FIG. 12A is a schematic view illustrating an example of a relationship between an applied voltage of a pixel electrode and a change in transmittance with time in the model illustrated in FIG. 11.
Figure 12B:
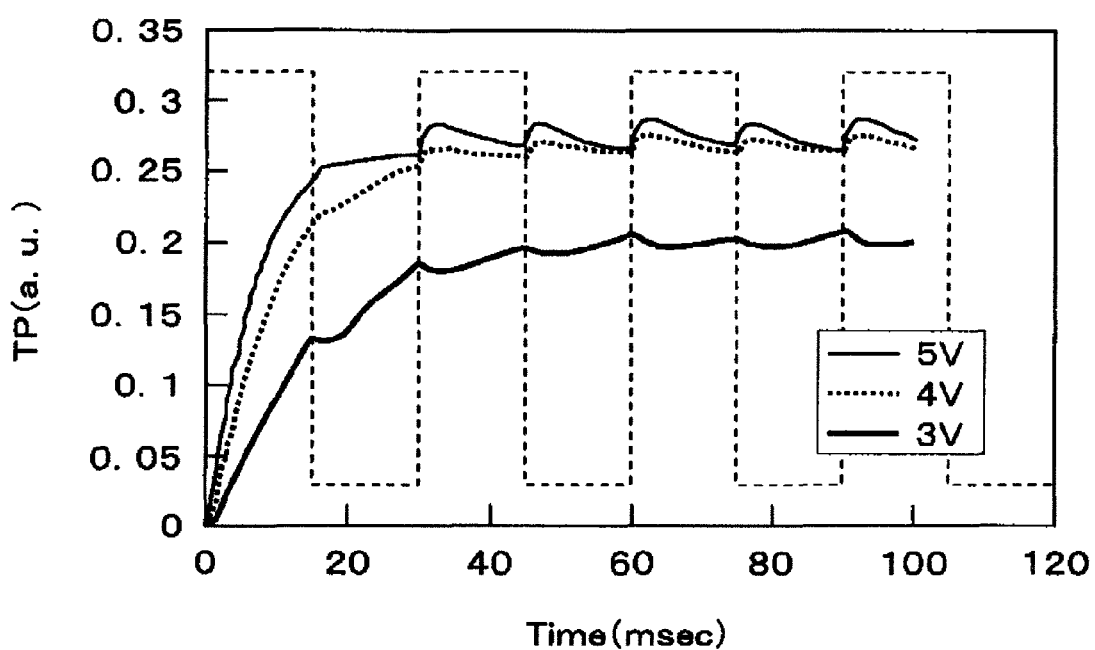
FIG. 12B is a schematic view illustrating another example of the relationship between an applied voltage of the pixel electrode and a change in transmittance with time in the model illustrated in FIG. 11.
Figure 13A:
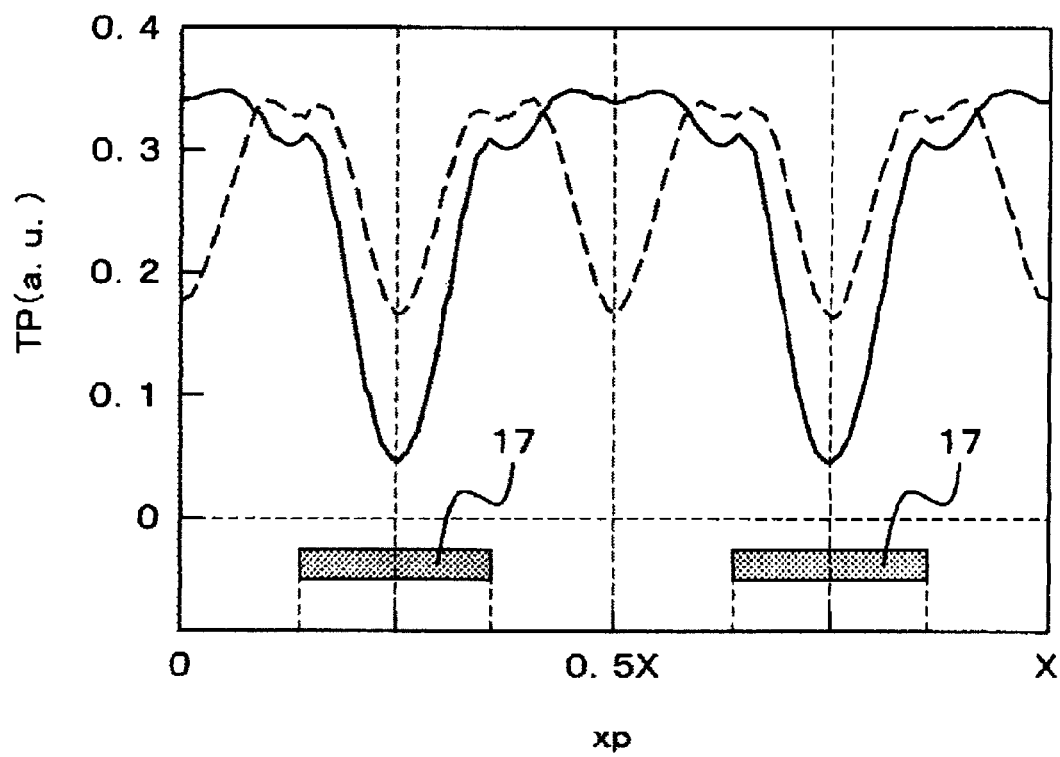
FIG. 13A is a schematic view illustrating an example of a relationship between an applied voltage of a pixel electrode and an in-plane distribution of a transmittance in the model illustrated in FIG. 11.
Figure 13B:
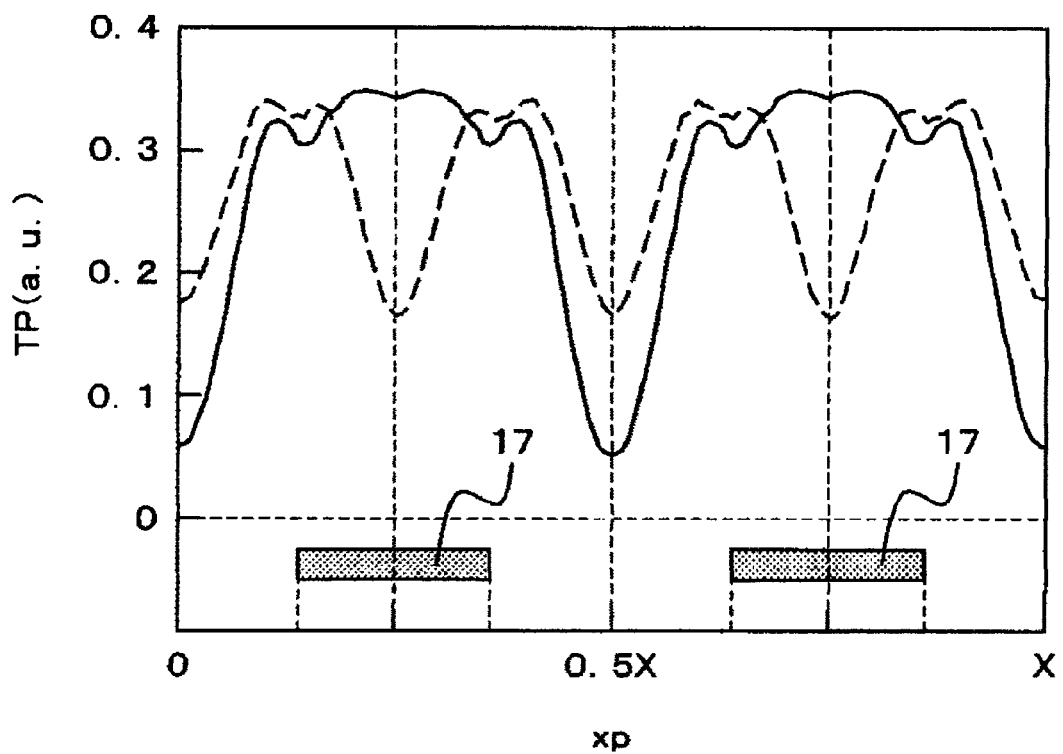
FIG. 13B is a schematic view illustrating another example of the relationship between an applied voltage of the pixel electrode and an in-plane distribution of a transmittance in the model illustrated in FIG. 11.
Figure 14A:
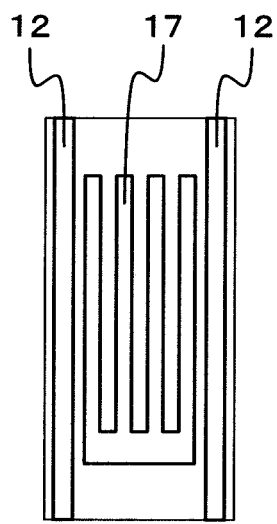
FIG. 14A is a schematic view illustrating an example of pixels in a liquid crystal display panel equivalent to those of the model illustrated in FIG. 11.
Figure 14B:
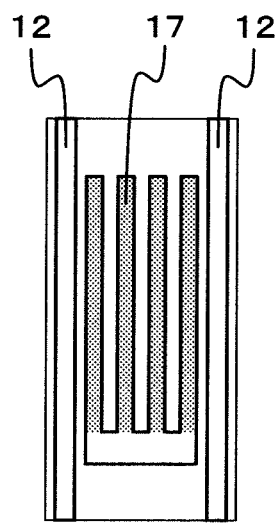
FIG. 14B is a schematic view illustrating an example of the relationship between an applied voltage of a pixel electrode and a transmittance in a liquid crystal display panel having pixels equivalent to those of the model illustrated in FIG. 11.
Figure 14C:
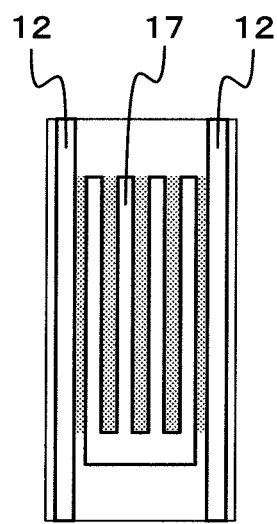
FIG. 14C is a schematic view illustrating another example of the relationship between an applied voltage of a pixel electrode and a transmittance in a liquid crystal display panel having pixels equivalent to those of the model illustrated in FIG. 11.

FIG. 7 is a schematic view illustrating an example of a relationship between the DC offset voltage and the flicker intensity. FIGS. 8A and 8B are schematic views illustrating an example of a relationship between the alignment of a liquid crystal layer and the flexoelectric polarization. FIG. 9 is a schematic cross-sectional view illustrating an example of a relationship between the electric field generated in the liquid crystal display panel and the flexoelectric polarization. FIGS. 10A and 10B are schematic plan views illustrating an example of a relationship between the flexoelectric polarization and the alignment of liquid crystal molecules. FIG. 11 is a schematic cross-sectional view illustrating a model of a pixel structure for investigating a change in alignment of the liquid crystal layer due to the flexoelectric polarization. FIGS. 12A and 12B are schematic views illustrating an example of a relationship between the applied voltage of pixel electrodes and the change in transmittance with time in the model illustrated in FIG. 11. FIGS. 13A and 13B are schematic views illustrating an example of a relationship between the applied voltage of pixel electrodes and the in-plane distribution of a transmittance in the model illustrated in FIG. 11. FIGS. 14A to 14C are schematic views illustrating an example of a relationship between the applied voltage of pixel electrodes and the transmittance in a liquid crystal display panel including pixels equivalent to those of the model illustrated in FIG. 11.

A pixel placed at a position close to the signal input terminal of the scan line 10 and a pixel placed at a position far from the signal input terminal of the scan line 10, which are provided in a liquid crystal display device performing active matrix drive used conventionally, are considered. In each of those pixels, there is a difference, as illustrated in FIG. 6, with respect to a change in a potential $V_G$ of a scanning signal applied to a gate electrode of the TFT element 13 and a change in a potential $V_{PX}$ of the pixel electrode 17. $V_{G1}$ and $V_{PX1}$ illustrated on the left side of FIG. 6 represent a potential of a scanning signal at a pixel placed at a position close to the signal input terminal of the scan line 10 and a potential of the pixel electrode 17, respectively. On the other hand, $V_{G2}$ and $V_{PX2}$ illustrated on the right side of FIG. 6 represent a potential of a scanning signal at a pixel placed at a position far from the signal input terminal of the scan line 10 and a potential of the pixel electrode 17, respectively.

The potential of a scanning signal at the signal input terminal at which a scanning signal is applied to the scan line 10 has a square wave as indicated by dotted lines, respectively, on both sides of FIG. 6. However, due to the influence of a wiring resistance and a wiring capacitance of the scan line 10, there is a distortion in the potential of the scanning signal at the pixel. In this case, the distortion from the square wave of the potential of the scanning signal is larger at a position far from the signal input terminal. Therefore, the waveform indicating a change in the potential $V_G$ of the scanning signal at a pixel far from the signal input terminal is further distorted compared with the waveform indicating a change in the potential $V_{G1}$ of the scanning signal at the closer pixel. More specifically, a shift from the square wave indicated by the dotted line is larger.

Further, the potentials $V_{PX1}$ and $V_{PX2}$ of the pixel electrodes 17 respectively illustrated on both the sides of FIG. 6 change respectively to substantially the same potentials as those of potentials DATA1 and DATA2 of the signal line 12 while each TFT element 13 is on. The potentials $V_{PX1}$ and $V_{PX2}$ of the pixel electrode 17 fluctuate due to the influence of parasitic capacitance formed between the gate electrode and the source electrode, when each TFT element 13 is changed from on to off. The fluctuation amount $V_{FT2}$ of the potential is smaller at a position far from the signal input terminal with respect to the fluctuation amount $V_{FT1}$ of the potential at a position closer to the signal input terminal, as illustrated on both sides of FIG. 6. On the other hand, a potential Vcom of the common electrode 15 is almost constant irrespective of the distance from the signal input terminal of the scan line 10. Therefore, in the case where a gray level voltage of the same potential is applied to those two pixels, after each TFT element 13 is turned from on to of f, there arises a difference between respective potential differences ΔV1 and ΔV2 of the pixel electrode 17 and the common electrode 15 while the potential of the pixel electrode 17 is held.

When there is a difference in the potential difference ΔV between the pixel electrode 17 and the common electrode 15 in the respective pixels in the case where the same gray level voltage is written in a plurality of pixels, the difference becomes a DC component, which causes a phenomenon called flicker.

Thus, in the conventional liquid crystal display device, the occurrence of flicker is suppressed by adding a component (DC offset voltage) cancelling the DC component described above to the gray level voltage.

In the case of suppressing the occurrence of flicker by adding a DC offset voltage to a gray level voltage in the conventional IPS liquid crystal display device, it is known that the relationship between the DC offset voltage VOS to be added and the flicker intensity IFL becomes, for example, a relationship as illustrated in FIG. 7. More specifically, the flicker intensity IFL takes a minimum value when a certain DC offset voltage is applied, and the DC offset voltage that minimizes the flicker intensity IFL is called an optimum DC offset voltage.

However, even in the case where the optimum DC offset voltage is added to the conventional IPS liquid crystal display device, the flicker intensity IFL does not become zero in many cases. The reason for this may be considered, for example, as the influence of ions present in the liquid crystal layer 3. More specifically, in the conventional liquid crystal display device, the possibility that a DC voltage is generated in liquid crystal due to the movement of ions in the liquid crystal layer 3 to cause flicker is considered. However, the specific resistance of a liquid crystal material used in a general liquid crystal display device is $10^{12}\Omega\cdot cm^2$ or more, and hence, flicker does not occur due to the influence of ions in an actual liquid crystal display device.

Based on the above, the inventors of this application newly studied the reason why the flicker intensity does not become zero even in the case where an optimum DC offset voltage is applied in the liquid crystal display device, to find that the polarization caused by a flexoelectric effect involved in splay deformation and bend deformation occurring when an electric field is applied to the liquid crystal layer 3 is related to the reason why the flicker intensity does not become zero.

The liquid crystal molecules include a plurality of different kinds of atoms, and the plurality of kinds of atoms respectively have different electronegativity, and hence, the liquid crystal molecules have polarization. Thus, the assembly of liquid crystal molecules such as the liquid crystal layer 3 becomes more stable in terms of energy in the case where the liquid crystal layer 3 is aligned so as to cancel the polarization of each liquid crystal molecule. Further, in the case where the liquid crystal molecules have a nematic phase, there are no distinctions of the front and the rear of the liquid crystal molecules with respect to the alignment direction, and hence, polarization does not appear in the entire liquid crystal layer. However, in the case where a rapid change in alignment occurs in the assembly of the liquid crystal molecules, the polarization of each liquid crystal molecule is not cancelled, and the polarization may appear in the entire liquid crystal layer. The polarization caused by a change in alignment is called flexoelectric polarization. The detail thereof is described, for example, in S. Chandrasekhar, "Liquid Crystals."

An example of the liquid crystal molecule causing flexoelectric polarization includes the case where a liquid crystal molecule has a wedge shape and the polarization direction is one of a leading end or a trailing end assuming that the tip end of the wedge shape is the trailing end and the opposite side thereof is the leading end. In the case where alignment deformation does not occur in the liquid crystal layer 3 including the assembly of wedge-shaped liquid crystal molecules described above, the molecules having a polarization direction in the right direction and the molecules having a polarization direction in the left direction are present substantially in the same ratio, for example, as illustrated in FIG. 8A. Therefore, the polarization of the respective liquid crystal molecules is cancelled, and macroscopic polarization does not appear.

In contrast, in the case where alignment deformation occurs, the ratio of the leading ends directed in the alignment direction becomes different from the ratio of the trailing ends directed in the alignment direction due to the asymmetry of the shape of the respective liquid crystal molecules and the excluded volume effect thereof. More specifically, in the case where acute splay deformation in which the liquid crystal layer 3 spreads in a fan shape from the right side to the left side occurs in the liquid crystal layer 3, for example, as illustrated in FIG. 8B, the ratio of the molecules having a polarization direction in the right direction becomes higher than the ratio of the molecules having a polarization direction in the left direction. Consequently, the polarization appears without being cancelled, and macroscopic flexoelectric polarization FP appears in a portion in which splay deformation occurs.

When a potential differenced occurs between the pixel electrode 17 and the common electrode 15 in an IPS-Pro liquid crystal display device, a line of electric force EF in an arc shape passing through the liquid crystal layer 3 is generated, for example, as illustrated in FIG. 9. At this time, in the case where the liquid crystal layer 3 has positive dielectric anisotropy, the alignment direction of the liquid crystal molecules in the portion where the line of electric force EF is generated rotates in a substrate plane, and tries to change so as to move closer to the direction of the line of electric force EF.

Further, at this time, on the interface of the liquid crystal layer 3 on the second alignment film 18 side, the second alignment film 18 tries to regulate the alignment of liquid crystal molecules to fix the alignment direction of the liquid crystal molecules in the alignment process direction.

Thus, on the interface of the liquid crystal layer 3 on the second alignment film 18 side and in the vicinity thereof (region BL1 illustrated in FIG. 9), two conflicting effects complete with each other. Therefore, an acute change in alignment (splay deformation) is generated from the interface of the second alignment film 18 to the portion where an electric field is present. Further, at this time, splay deformations in opposite directions are generated between two adjacent teeth of the pixel electrode 17, as illustrated in FIG. 9. Thus, the flexoelectric polarization FP is generated in the liquid crystal layer 3 in the direction indicated by an open arrow illustrated in FIG. 9.

As illustrated in FIG. 9, in the liquid crystal layer 3, splay deformation is also generated in the region BL2 along the lamination direction from the vicinity of the center to the interface on the first alignment film 7 side. However, the alignment deformation of the splay deformation in the region BL2 is relatively small compared with that in the region BL1, and further, is away from the second substrate 2 (second alignment film 18) in which an electric field is concentrated. Therefore, the influence of the splay deformation in the region BL2 is smaller than that in the region BL1, and hence, the splay deformation in the region BL2 is not considered in the following description.

In the case where the flexoelectric polarization FP is generated in the liquid crystal layer 3, the flexoelectric polarization itself causes a change in alignment in response to an electric field (line of electric force EF), and the polarization caused by the alignment deformation due to dielectric anisotropy is added further. The relationship between the direction of an electric field (line of electric force EF) and the direction of the flexoelectric polarization FP when the potential of the pixel electrode 17 is set to be higher than that of the common electrode 15 becomes a relationship, for example, as illustrated in FIG. 10A. In FIG. 10A, the alignment deformation attributed to dielectric anisotropy is separated from the alignment deformation attributed to the flexoelectric polarization FP, and hence the effect of the latter is exhibited explicitly. Therefore, the flexoelectric polarization FP in FIG. 10A is the flexoelectric polarization in an alignment state considering only the alignment deformation attributed to dielectric anisotropy without considering an electric field response of the flexoelectric polarization itself.

In the case of not considering the flexoelectric polarization FP, a change in an alignment direction of the liquid crystal layer 3 under an electric field application is expressed by the rotation in the clockwise direction in FIG. 10A. Further, in the IPS-Pro system, it is considered that an actual rotation angle can be set to be almost close to an optimum value by optimizing the pixel structure and the driving conditions.

In contrast, a change in alignment caused by the flexoelectric polarization FP is expressed by the rotation in which the flexoelectric polarization becomes close to the state parallel to the electric field direction. Consequently, as illustrated in FIG. 10A, a portion where the rotation occurs in a clockwise direction and a portion where the rotation occurs in a counterclockwise direction appear alternately. In FIG. 10A, in a gap portion (on a slit) of two adjacent teeth of the pixel electrode 17, the rotation in a counterclockwise direction occurs. In this case, the alignment of liquid crystal molecules on the slit of the pixel electrode 17 changes so as to return substantially to the state under no voltage application, and a transmittance changes. The rotation in a clockwise direction occurs on the pixel electrode 17, and hence, a transmittance changes similarly.

Further, when the potential of the pixel electrode 17 is set to be lower than that of the common electrode 15, as illustrated in FIG. 10B, the rotation in a clockwise direction occurs in a gap portion (on a slit) of the teeth of the pixel electrode, and the rotation in a counterclockwise direction occurs on the pixel electrode. Even in this case, a transmittance changes in the same manner as the above due to the electric field response of the flexoelectric polarization FP.

Thus, in the case where a liquid crystal display panel is driven while polarity is rotated for each predetermined number of a flame period, the fluctuation in a transmittance is observed even in any flame period (polarity). Herein, the polarity refers to a sign indicating whether the potential of the pixel electrode 17 is higher or lower than that of the common electrode 15.

In summary, in the IPS-Pro liquid crystal display device, when a voltage is applied, acute splay deformation is generated. Consequently, in the case where the liquid crystal layer 3 contains liquid crystal molecules having a molecule shape in a wedge shape indicating the polarization in a leading or trailing end direction, the flexoelectric polarization FP is generated. When the flexoelectric polarization FP is generated, the flexoelectric polarization itself causes a change in alignment that returns to substantially a state under no voltage application in response to an electric field, and consequently, a transmittance changes due to the polarity of a voltage to be applied.

The inventors of this application conducted an investigation regarding to which degree the fluctuation in a transmittance attributed to the flexoelectric polarization FP described above influences the flicker intensity. It is well-known that the alignment of the liquid crystal layer 3 can be obtained from Frank's elastic free energy expressed by the following Mathematical Equation 4.

$$f_{elas} = \frac{1}{2}[K_{11}(\nabla \cdot n)^2 + K_{22}(n \cdot \nabla \times n)^2 + K_{33}(n \times \nabla \times n)^2] \quad (4)$$

In Mathematical Equation 4, n is an alignment vector, and $K_{11}$, $K_{22}$, and $K_{33}$ are elastic constants corresponding to splay deformation, twist deformation, and bend deformation, respectively.

In the case of considering the flexoelectric polarization FP when the alignment of the liquid crystal layer 3 is obtained, electric polarization P induced by the flexoelectric polarization FP can be incorporated in Mathematical Equation 4. The relationship expressed by the following Mathematical Equation 5 is held between the electric polarization P and the distortion of the alignment vector n.

$$P = e_{11}(\nabla \cdot n)^2 + e_{33}(n \times \nabla \times n)^2 \quad (5)$$

In Mathematical Equation 5, $e_{11}$ and $e_{33}$ are flexoelectric coefficients corresponding to splay deformation and bend deformation, respectively.

The flexoelectric coefficient varies depending upon the liquid crystal material, and can be measured using, for example, methods described in T. Takashi, et. al. Jpn. J. Appl. Phys. Vol. 37, 1998, p. 1865, E. K. Tidey, et. al. Liq. Cryst. Vol. 34, No. 2, 2007, p. 251, and Darren R. Link, et. al. Phys. Rev. E, Vol. 65, 2001, 010701. Thus, by incorporating the electric polarization P obtained from Mathematical Equation 5 into Mathematical Equation 4, the alignment of the liquid crystal layer 3 with the flexoelectric polarization FP (flexoelectric effect) introduced thereto can be calculated.

For calculating the alignment of the liquid crystal layer 3 by Mathematical Equations 1 and 2, the inventors of this application used a model in which the first substrate 1, the second substrate 2 in which the plate-shaped common electrode 15, the interlayer insulating film (third insulating film 16), and the interdigital pixel electrode 17 were laminated, as illustrated in FIG. 1. At this time, a width L (electrode width) of a tooth of the pixel electrode 17 was set at 4 μm, and a gap S of the tooth was set at 5 μm. Further, a thickness T1 of the third insulating film 16 was set at 400 μm, and a thickness T2 of the liquid crystal layer 3 was set at 3.5 μm. Further, the liquid crystal layer 3 was formed of a liquid crystal material having a dielectric anisotropy $\Delta \in$ of 6.5 and a retardation $\Delta n \cdot d$ of 380 μm, and a pre-tilt angle was set at two.

Further, an LCD-Master (produced by Shintech) in which two-dimensional simulation can be performed and the electric polarization P expressed by Mathematical Equation 5 can be incorporated was used for calculating the alignment of the liquid crystal layer 3.

The inventors of this application calculated a change in transmittance with time when a predetermined AC voltage was applied to the pixel electrode 17, based on the alignment of the liquid crystal layer 3 obtained by the calculation using the above-mentioned simulator, and the results as illustrated in FIGS. 12A and 12B were obtained. FIGS. 12A and 12B are graphs respectively in which a horizontal axis represents a time (msec) and a vertical axis represents a transmittance TP (arbitrary unit). FIG. 12A illustrates a change in transmittance TP when an AC voltage of ±5 V is applied to the pixel electrode 17 with the flexoelectric coefficient being $e_{11} = e_{33} = 10$ pC/m, in which a solid line represents a change in the case of considering the flexoelectric effect. Further, FIG. 12B illustrates a change in transmittance TP when an AC voltage of ±5 V is applied to the pixel electrode 17, when an AC voltage of ±4 V is applied, and an AC voltage of ±3 V is applied, with the flexoelectric coefficient being $e_{11} = e_{33} = 10$ pC/m.

As indicated by the solid line of FIG. 12A, in the case of considering the flexoelectric effect, the transmittance TP fluctuates in accordance with the polarity of a voltage to be applied to the pixel electrode 17. In contrast, as indicated by the broken line of FIG. 12A, in the case of calculating without considering the flexoelectric effect, the transmittance TP does not fluctuate in accordance with the polarity of a voltage to be applied to the pixel electrode 17.

Further, as is also understood from T. Takahashi, et al. Jpn. J. Appl. Phys. Vol. 37, 1998, p. 1865, generally, in the case of measuring a flexoelectric coefficient, the flexoelectric coefficient is measured as a sum or difference of $e_{11}$ and $e_{33}$. Further, in T. Takahashi, et al. Jpn. J. Appl. Phys. Vol. 37, 1998, p. 1865, the absolute values of the flexoelectric coefficients $e_{11}$ and $e_{33}$ of a general liquid crystal material are considered as about 10 pC/m. Thus, in the liquid crystal display panel using a general liquid crystal material, it is considered that the transmittance TP fluctuates as illustrated in FIG. 12A in accordance with the polarity of a voltage to be applied to the pixel electrode.

Further, the fluctuation of the transmittance TP in the case of considering the flexoelectric effect was investigated changing the magnitude of a voltage to be applied to the pixel electrode 17, and the results as illustrated in FIG. 12B were obtained.

As illustrated in FIG. 12B, as a voltage to be applied to the pixel electrode 17 increases, the range in which the transmittance TP fluctuates in accordance with the polarity of an applied voltage becomes larger. The flexoelectric effect is polarization induced by the distortion of the alignment of the liquid crystal layer 3, as described above. Thus, it can be said that the polarization to be generated increases and the fluctuation in the transmittance TP increases due to the application of a high voltage.

The in-plane distribution of the transmittance TP in a section from x=0 to x=X illustrated in FIG. 11 was calculated using the above-mentioned simulator, and the results as illustrated in FIGS. 13A and 13B were obtained. FIGS. 13A and 13B are respectively graphs in which a horizontal axis represents a position xp in an x-direction in the section from x=0 to x=X, and a vertical axis represents a transmittance TP (arbitrary unit). Further, FIG. 13A illustrates an in-plane distribution of the transmittance TP when a positive voltage (5 V) is applied to the pixel electrode 17, in which a solid line represents an in-plane distribution in the case of considering the flexoelectric effect and a broken line represents an in-plane distribution without considering the flexoelectric effect. FIG. 13B illustrates an in-plane distribution of the transmittance TP when a negative voltage (−5 V) is applied to the pixel electrode 17, in which a solid line represents an in-plane distribution in the case of considering the flexoelectric effect and a broken line represents an in-plane distribution without considering the flexoelectric effect.

As illustrated in FIGS. 13A and 13B, the in-plane distribution of the transmittance TP without considering the flexoelectric effect becomes substantially the same distribution irrespective of the polarity of a voltage to be applied to the pixel electrode 17.

In contrast, in the case of considering the flexoelectric effect, the fluctuation in the transmittance TP in a plane was observed depending upon the polarity of a voltage applied to the pixel electrode 17. When a positive voltage is applied, the transmittance TP on the tooth of the pixel electrode 17 becomes low and the transmittance TP on the gap of the teeth becomes high, as illustrated in FIG. 13A. Further, when a negative voltage is applied, the transmittance TP on the tooth of the pixel electrode 17 becomes high, and the transmittance TP on the gap of the teeth becomes low, as illustrated in FIG. 13B.

The inventors of this application consider that the fluctuation in the transmittance TP in a plane caused by the flexoelectric effect is a main component of the flicker intensity remaining when an optimum DC offset voltage is applied as illustrated in FIG. 7. The same phenomenon may occur, for example, even due to the influence of ions in liquid crystal. However, as described above, because the specific resistance of liquid crystal is sufficiently high, the influence of ions may be considered to be negligibly small in the IPS-Pro liquid crystal display device according to the present invention.

Next, in order to investigate the validity of the above-mentioned simulation results, the inventors of this application produced a liquid crystal display panel having pixels (liquid crystal cells) equivalent to those of a model used in the simulation, and measured a transmittance when an AC voltage of 30 Hz was applied to the pixel electrode. Results as illustrated in FIGS. 14A to 14C were obtained. FIG. 14A illustrates a plane shape of the pixel electrode 17 in the produced liquid crystal display panel. FIG. 14B illustrates an image of a pixel when a positive voltage (5 V) is applied to the pixel electrode 17, and FIG. 14C is an image of a pixel when a negative voltage (−5 V) is applied to the pixel electrode 17. Further, FIGS. 14B and 14C respectively illustrate images after 8 msec from the switch of the polarity of a voltage to be applied to the pixel electrode 17.

In the case of applying a positive voltage to the pixel electrode 17, as illustrated in FIG. 14B, a dark line is generated in a portion on the tooth of the pixel electrode 17. On the other hand, in the case of applying a negative voltage to the pixel electrode 17, as illustrated in FIG. 14C, a dark line is generated on a gap portion of the teeth of the pixel electrode 17. More specifically, it can be said that the in-plane distribution of the transmittance TP illustrated in FIGS. 13A and 13B obtained in the simulation reproduces well the in-plane distribution of a transmittance in an actual liquid crystal display device. Thus, the flexoelectric effect cannot be considered as a negligible effect as the cause of flicker in the IPS liquid crystal display device.

Thus, in order to decrease the flicker intensity remaining in the IPS liquid crystal display device, the fluctuation in the transmittance TP caused by the flexoelectric effect can be suppressed.

EXAMPLE 1

In order to decrease the flicker intensity remaining in an IPS-Pro liquid crystal display panel, in a liquid crystal display device according to Example 1, absolute values of flexoelectric coefficients $e_{11}$ and $e_{33}$ of the liquid crystal layer 3 are set at 7 pC/m or less, to thereby suppress the fluctuation of the transmittance TP attributed to the flexoelectric effect. Hereinafter, the grounds therefor are described.

The liquid crystal display panel of the liquid crystal display device according to Example 1 has pixels having a configuration as illustrated in FIGS. 1 to 3, and the other configurations than that of the liquid crystal layer 3 are the same as those of the conventional liquid crystal display panel.

FIGS. 15A to 18B are schematic views illustrating a method of suppressing a fluctuation of a transmittance in the liquid crystal display device according to Example 1 of the present invention.

Figure 15A:
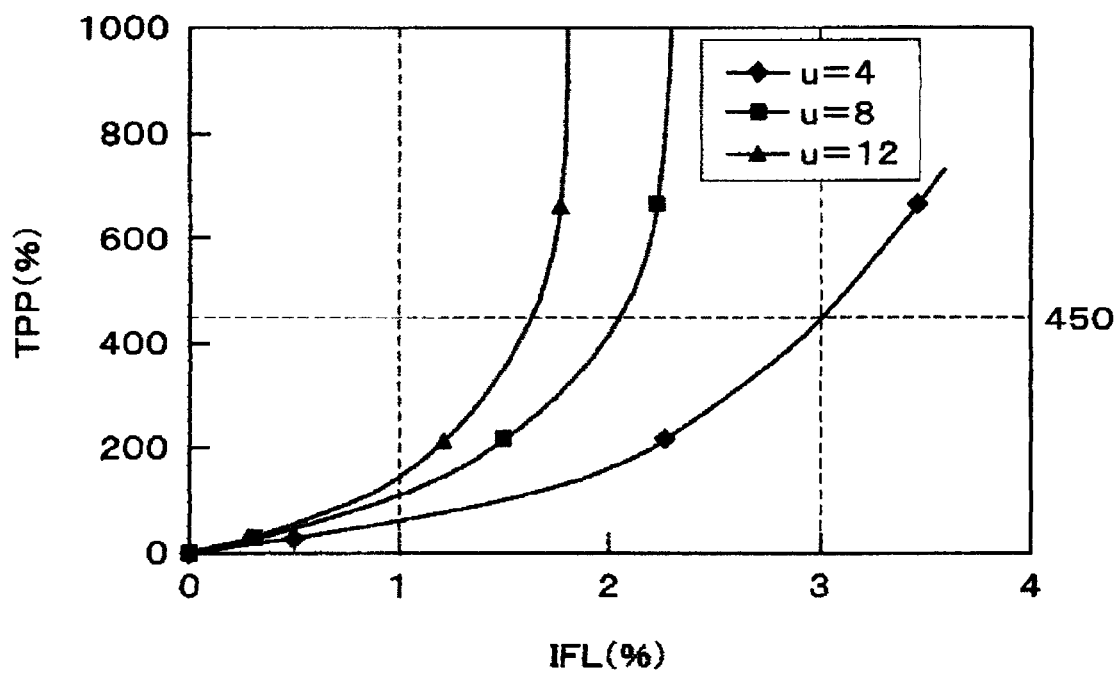
FIG. 15A is a schematic view illustrating an example of a relationship between a flicker intensity and a transmittance fluctuation rate in an IPS-Pro liquid crystal display device.
Figure 15B:
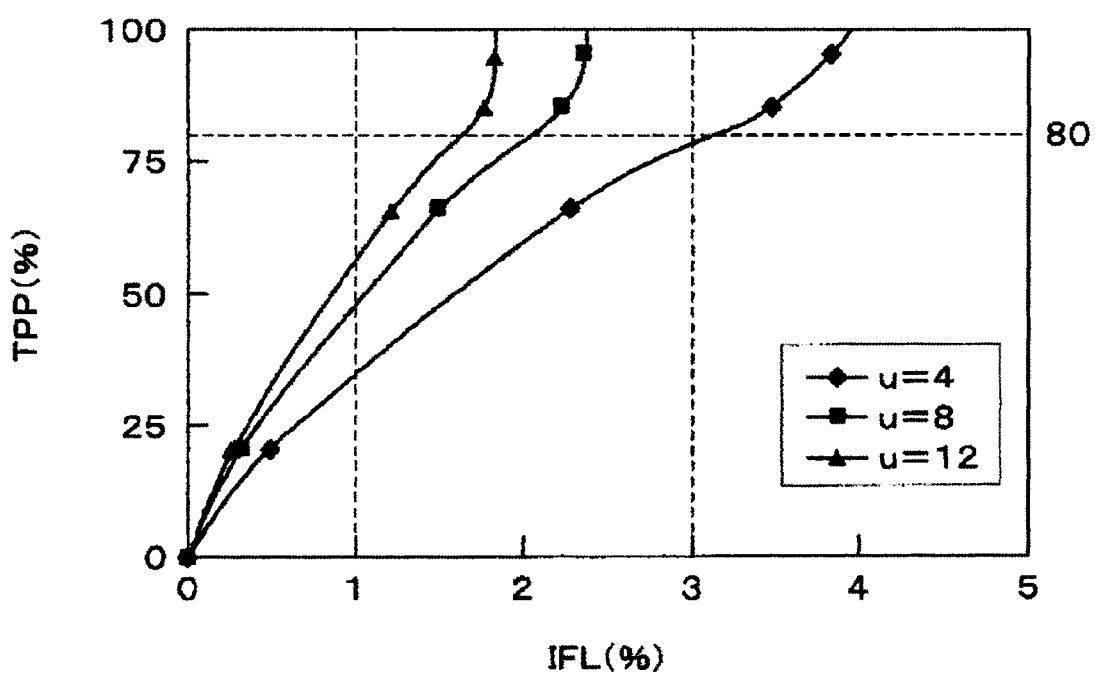
FIG. 15B is a schematic view illustrating another example of the relationship between a flicker intensity and a transmittance fluctuation rate in the IPS-Pro liquid crystal display device.
Figure 16:
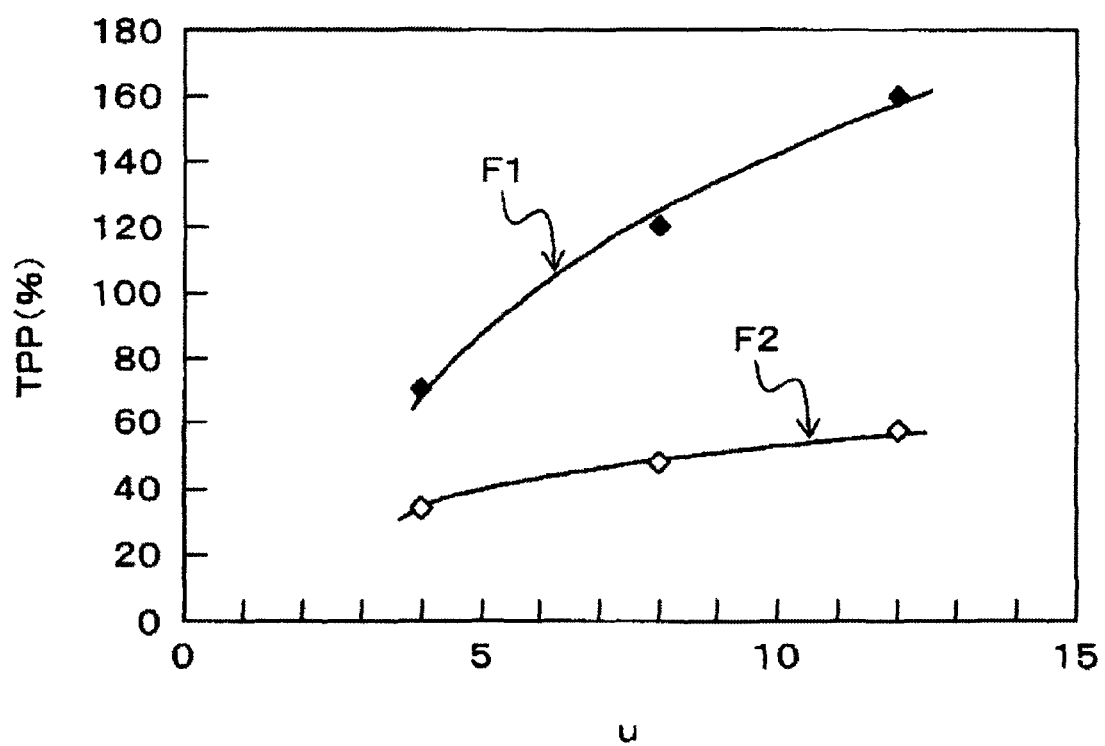
FIG. 16 is a schematic view illustrating an example of a relationship between the number of teeth of a pixel electrode and a transmittance fluctuation rate in the IPS-Pro liquid crystal display device.
Figure 17A:
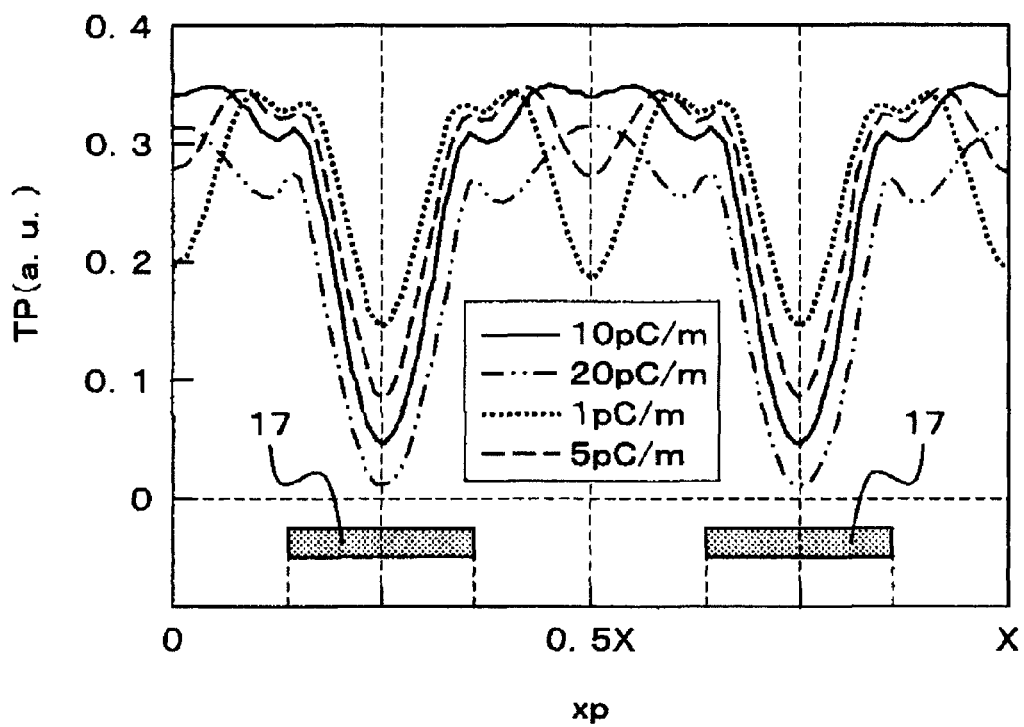
FIG. 17A is a schematic view illustrating an example of a relationship between a flexoelectric coefficient and the in-plane distribution of a transmittance.
Figure 17B:
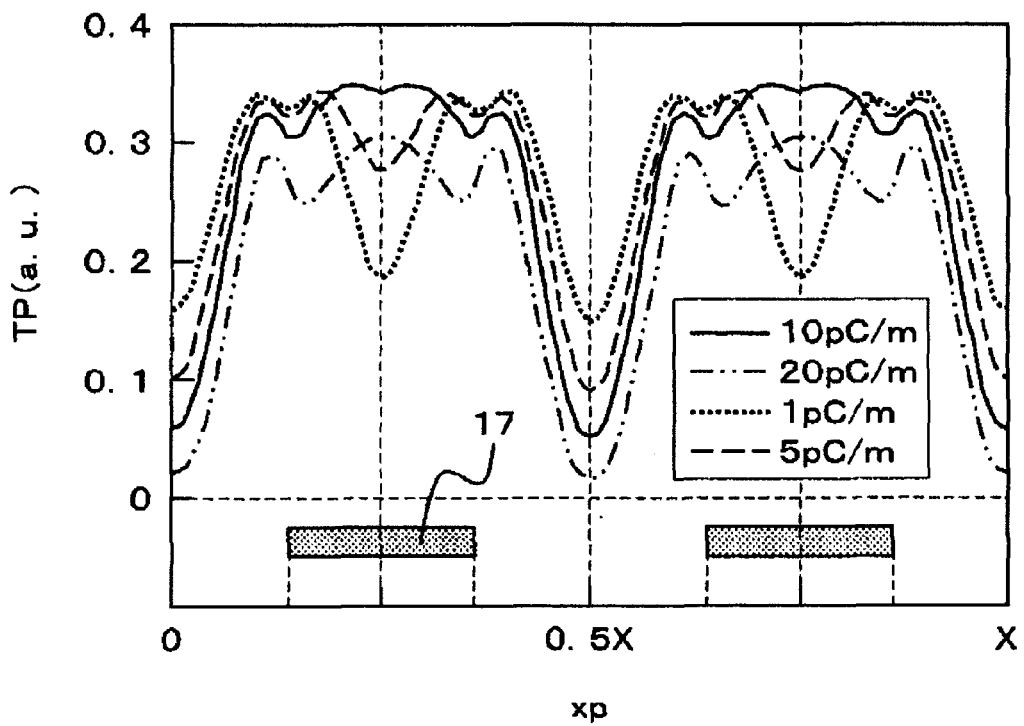
FIG. 17B is a schematic view illustrating another example of the relationship between the flexoelectric coefficient and the in-plane distribution of a transmittance.
Figure 18A:
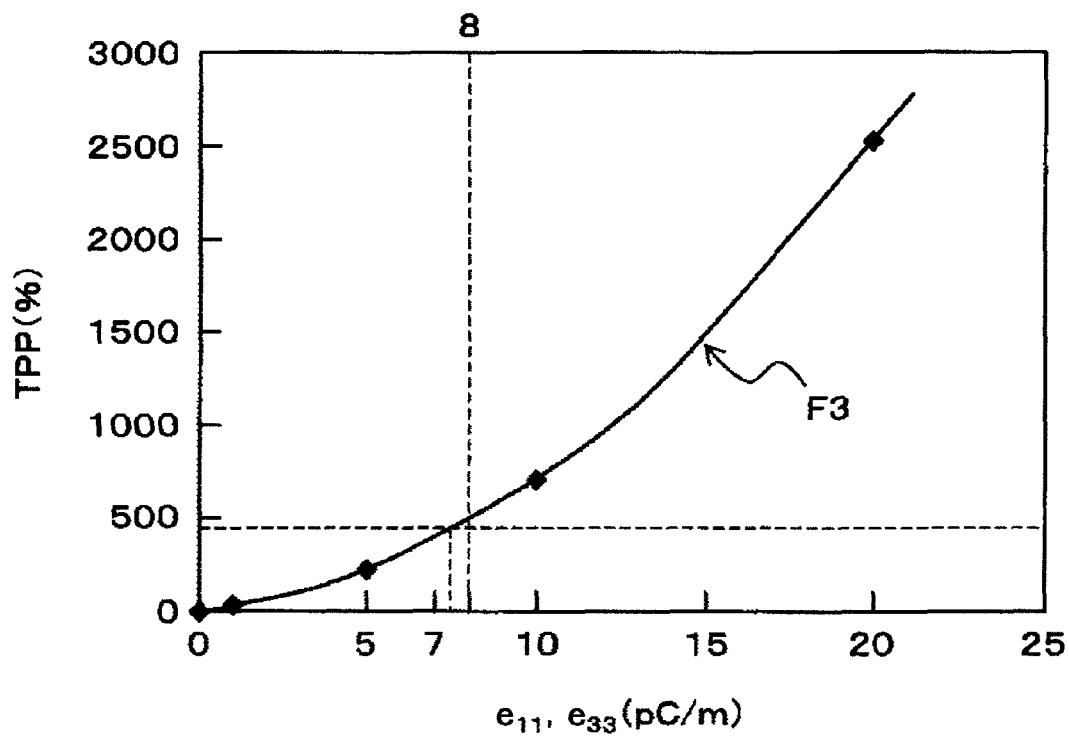
FIG. 18A is a schematic view illustrating an example of a relationship between the flexoelectric coefficient and the flicker intensity.
Figure 18B:
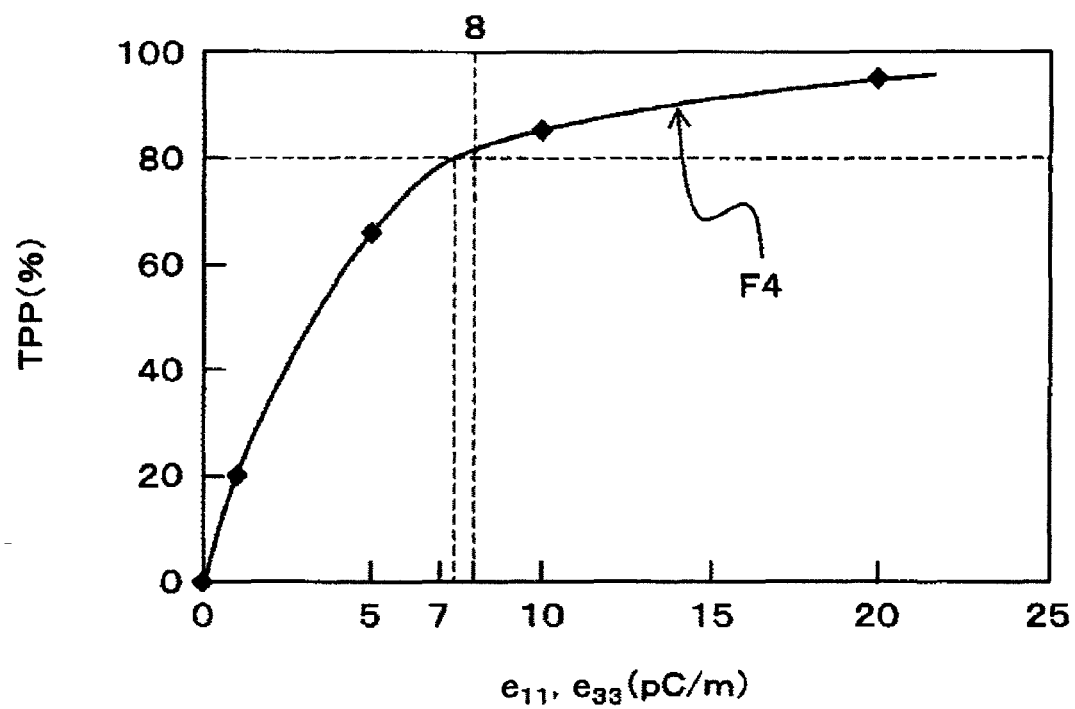
FIG. 18B is a schematic view illustrating another example of the relationship between the flexoelectric coefficient and the flicker intensity.

FIGS. 15A and 15B are schematic views illustrating an example of a relationship between the flicker intensity and the transmittance fluctuation rate in an IPS-Pro liquid crystal display device. FIG. 16 is a schematic view illustrating an example of a relationship between the number of teeth of a pixel electrode and a transmittance fluctuation rate in the IPS-Pro liquid crystal display device. FIGS. 17A and 17B are schematic views illustrating an example of a relationship between the flexoelectric coefficient and the in-plane distribution of a transmittance. FIGS. 18A and 18B are schematic views illustrating an example of a relationship between the flexoelectric coefficient and the flicker intensity.

In order to suppress a fluctuation in the transmittance TP attributed to the flexoelectric effect in the IPS-Pro liquid crystal display device, the inventors of this application first studied the relationship between the flicker intensity and the fluctuation of the transmittance TP.

The inventors of this application investigated the relationship between the flicker intensity and the in-plane transmittance fluctuation rate, and the effects as illustrated in FIGS. 15A and 15B were obtained. FIGS. 15A and 15B respectively are graphs in which a horizontal axis represents a flicker intensity IFL (%) and a vertical axis represents a transmittance fluctuation rate TPP (%). Further, FIG. 15A illustrates a relationship between the flicker intensity IFL and the transmittance fluctuation rate TPP on the tooth of the pixel electrode 17, and FIG. 15B illustrates a relationship between the flicker intensity IFL and the transmittance fluctuation rate TPP on a gap portion of the teeth.

Here, a portion on the tooth refers to that on the center of the tooth in a width direction (arrangement direction), and a portion on a gap portion of the teeth refers to that on the middle point of a gap between two adjacent teeth.

A transmittance fluctuation rate TPP is a ratio between a maximum transmittance and a minimum transmittance in a certain place in a pixel when a predetermined AC voltage is applied to the pixel electrode 17. The transmittance fluctuation rate TPP of 0% means that the transmittance TP does not fluctuate at all depending upon the polarity of a voltage to be applied to the pixel electrode 17.

Further, the flicker intensity IFL changes depending upon the number of teeth of the pixel electrode 17. Therefore, FIGS. 15A and 15B respectively illustrate a relationship between the flicker intensity IFL and the transmittance fluctuation rate TPP in the case of four teeth, in the case of eight teeth, and in the case of 12 teeth.

In the IPS-Pro liquid crystal display device, in order to prevent flicker from being observed when an optimum DC off set voltage is applied to a gray level voltage, for example, it is necessary to set the flicker intensity IFL (the remaining flicker intensity) attributed to the flexoelectric effect within 3%, desirably within 1%. Therefore, in the case where the number of teeth of the pixel electrode 17 is four, for example, in order to set the flicker intensity IFL within an allowable range (within 3%), it is necessary to set the transmittance fluctuation rate TPP on the tooth at 450% or less and to set the transmittance fluctuation rate TPP on a gap portion of the teeth at 80% or less.

Further, from the results illustrated in FIGS. 15A and 15B, the relationship between the number of teeth of the pixel electrode 17 and the transmittance fluctuation rate TPP in the case of setting the flicker intensity IFL at 1% is, for example, as illustrated in FIG. 16. FIG. 16 illustrates a graph in which a horizontal axis represents the number of teeth u of the pixel electrode 17 and a vertical axis represents a transmittance fluctuation rate TPP (%). Further, in FIG. 16, a solid diamond (♦) indicates measurement results of the transmittance fluctuation rate TPP on the tooth, and an open diamond (◊) indicates measurement results of the transmittance fluctuation rate TPP on a gap portion.

Further, in FIG. 16, a curve F1 is a regression curve of the transmittance fluctuation rate TPP on the tooth, and a curve F2 is a regression curve of the transmittance fluctuation rate TPP on a gap portion. The regression curves F1 and F2 are respectively functions using the number of teeth u of the pixel electrode as a variable, and are expressed by the following Mathematical Equations 6 and 7.

$$F1 = 81 \times \log_e(u) - 44 \quad (6)$$

$$F2 = 20 \times \log_e(u) + 7 \quad (7)$$

Thus, in order to set the flicker intensity IFL remaining in the case of adding an optimum DC offset voltage within 10, a transmittance fluctuation rate TPP1 on the tooth and a transmittance fluctuation rate TPP2 on a gap portion can be set so as to satisfy the following Mathematical Equations 2 and 3.

$$TPP1 \geq 81 \times \log_e(u) - 44 \quad (2)$$

$$TPP2 \geq 20 \times \log_e(u) + 7 \quad (3)$$

More specifically, in the liquid crystal display device of Example 1, the liquid crystal layer 3 is formed using a liquid crystal material having such flexoelectric coefficients $e_{11}$ and $e_{33}$ that the transmittance fluctuation rate TPP1 on the tooth of the pixel electrode 17 and the transmittance fluctuation rate TPP2 on a gap portion satisfy Mathematical Equations 2 and 3.

The inventors of this application investigated the relationship between the flexoelectric coefficient of the liquid crystal layer 3 and the in-plane distribution of the transmittance TP, and obtained the results as illustrated in FIGS. 17A and 17B. FIGS. 17A and 17B are respectively graphs in which a horizontal axis represents a position xp in a section from x=0 to x=X illustrated in FIG. 11, and a vertical axis represents a transmittance TP. Further, FIG. 17A illustrates flexoelectric coefficient dependency of an in-plane distribution of the transmittance TP when a positive voltage (5 V) is applied to the pixel electrode 17, and FIG. 17B illustrates flexoelectric coefficient dependency of an in-plane distribution of the transmittance TP when a negative voltage (-5 V) is applied to the pixel electrode.

Further, FIGS. 17A and 17B respectively illustrate a distribution curve in the case where the flexoelectric coefficients $e_{11}$ and $e_{33}$ are set at 10 pC/m, 20 pC/m, 1 pC/m, and 5 pC/m, respectively.

By decreasing the flexoelectric coefficients $e_{11}$ and $e_{33}$ as illustrated in FIGS. 17A and 17B, the difference between the distribution of the transmittance TP when a positive voltage is applied and the distribution of the transmittance TP when a negative voltage is applied becomes small, and the transmittance fluctuation rate in a plane becomes small. Thus, by forming the liquid crystal layer 3 using a liquid crystal material with small flexoelectric coefficients $e_{11}$ and $e_{33}$, the flicker intensity IFL attributed to the flexoelectric effect can be decreased.

Further, the relationship between the flexoelectric coefficients $e_{11}$ and $e_{33}$ and the transmittance fluctuation rate TPP based on the measurement results of the in-plane distribution of the transmittance TP illustrated in FIGS. 17A and 17B are as illustrated in FIGS. 18A and 18B. In respective FIGS. 18A and 18B, a horizontal axis represents flexoelectric coefficients $e_{11}$ and $e_{33}$ (pC/m), and a vertical axis represents the transmittance fluctuation rate TPP (%). Further, FIG. 18A is a graph illustrating flexoelectric coefficient dependency of the transmittance fluctuation rate TPP on the tooth of the pixel electrode 17, and FIG. 18B is a graph illustrating flexoelectric coefficient dependency of the transmittance fluctuation rate TPP on a gap portion of the teeth.

Further, a curve F3 illustrated in FIG. 18A and a curve F4 illustrated in FIG. 18B are respectively regression curves calculated from the transmittance fluctuation rate TPP when the flexoelectric coefficients $e_{11}$ and $e_{33}$ are 10 pC/m, 20 pC/m, 1 pC/m, and 5 pC/m.

In the case where the number of teeth u of the pixel electrode 17 is four, in order to suppress the remaining flicker intensity IFL within 3%, the transmittance fluctuation rate TPP1 on the tooth needs to be 450% or less and the transmittance fluctuation rate TPP2 on a gap portion needs to be 80% or less, as described above.

Thus, in the case where the number of teeth u of the pixel electrode 17 is set at four in the liquid crystal display device of Example 1, it is desirable from FIGS. 18A and 18B to use a liquid crystal material, in which absolute values of the flexoelectric coefficients $e_{11}$ and $e_{33}$ are 7 pC/m or less, for the liquid crystal layer 3.

Further, in order to suppress the flicker intensity IFL within 1%, it is necessary to further decrease the transmittance fluctuation rate TPP1 on the tooth and the transmittance fluctuation rate TPP2 on a gap portion, as illustrated in FIGS. 15A and 15B. Further, the transmittance fluctuation rates TPP1 and TPP2 at which the flicker intensity IFL becomes 1% vary depending upon the number of teeth u of the pixel electrode 17. Therefore, in the liquid crystal display device of Example 1, the flexoelectric coefficients $e_{11}$ and $e_{33}$ of the liquid crystal material used for the liquid crystal layer 3 can be changed appropriately based on the relationships illustrated in FIGS. 15A and 15B and FIGS. 18A and 18B in accordance with the number of teeth u of the pixel electrode 17.

The flexoelectric coefficients $e_{11}$ and $e_{33}$ of the liquid crystal layer 3 are determined mainly by the shape of liquid crystal and the polarizability of liquid crystal molecules. In order to decrease the flexoelectric coefficients of the liquid crystal layer 3, for example, a liquid crystal material having a molecular structure in which the shape of liquid crystal molecules has a molecular structure closer to a bar shape can be used. Further, in order to decrease the polarizability of liquid crystal molecules, a liquid crystal material having a small absolute value of dielectric anisotropy $\Delta \in$ can be used as liquid crystal, and in particular, it is desired that $\Delta \in = 0$. However, in the case of using liquid crystal having small dielectric anisotropy, there is a disadvantage that a driving voltage becomes high.

Therefore, in order to decrease the flexoelectric coefficient of the liquid crystal layer 3, for example, it is desired to mix a liquid crystal material having dielectric anisotropy $\Delta\in$ of 1 or less ($\Delta\in\leq 1$) with a liquid crystal material having dielectric anisotropy of more than 1 ($\Delta\in>1$). At this time, in the liquid crystal material used as the liquid crystal layer 3, for example, it is desired to set the content of the liquid crystal material having dielectric anisotropy $\Delta\in$ of 1 or less ($\Delta\in\leq 1$) at 40% or more.

As described above, in the liquid crystal display device according to Example 1, the absolute values of the flexoelectric coefficients $e_{11}$ and $e_{33}$ of the liquid crystal layer 3 are set at 7 pC/m or less, and hence the difference in in-plane distribution of transmittance between the case where a positive voltage is applied to the pixel electrode 17 and the case where a negative voltage is applied to the pixel electrode 17 can be decreased. Therefore, in the IPS-Pro liquid crystal display device, the flicker intensity IFL that still remains even when an optimum DC offset voltage is applied can be decreased.

Further, flexoelectric polarization occurs when splay deformation or bend deformation is generated in the liquid crystal layer 3. Therefore, the flexoelectric polarization can also be decreased by increasing an elastic constant $K_{11}$ corresponding to splay deformation and an elastic constant $K_{33}$ corresponding to bend deformation so as to prevent each deformation from being generated. In this case, in order to set the flicker intensity within an allowable range, for example, it is desired to set both the elastic constants $K_{11}$ and $K_{33}$ at 13.0 pN or more. Further, in order to set the flicker intensity within 1%, it is desired to set both the elastic constants $K_{11}$ and $K_{33}$ at 16.0 pN or more.

Further, in the liquid crystal display device according to Example 1, the IPS-Pro liquid crystal display device having the pixel electrode 17 in a plane shape as illustrated in FIG. 1 is exemplified. However, the present invention is not limited thereto, and even when the pixel electrode 17 has, for example, a plane shape as illustrated in FIGS. 5 and 6, the remaining flicker intensity IFL can be decreased, needless to say, by setting the absolute values of the flexoelectric coefficients $e_{11}$ and $e_{33}$ of the liquid crystal layer 3 at 7 pC/m or less.

Figure 19:
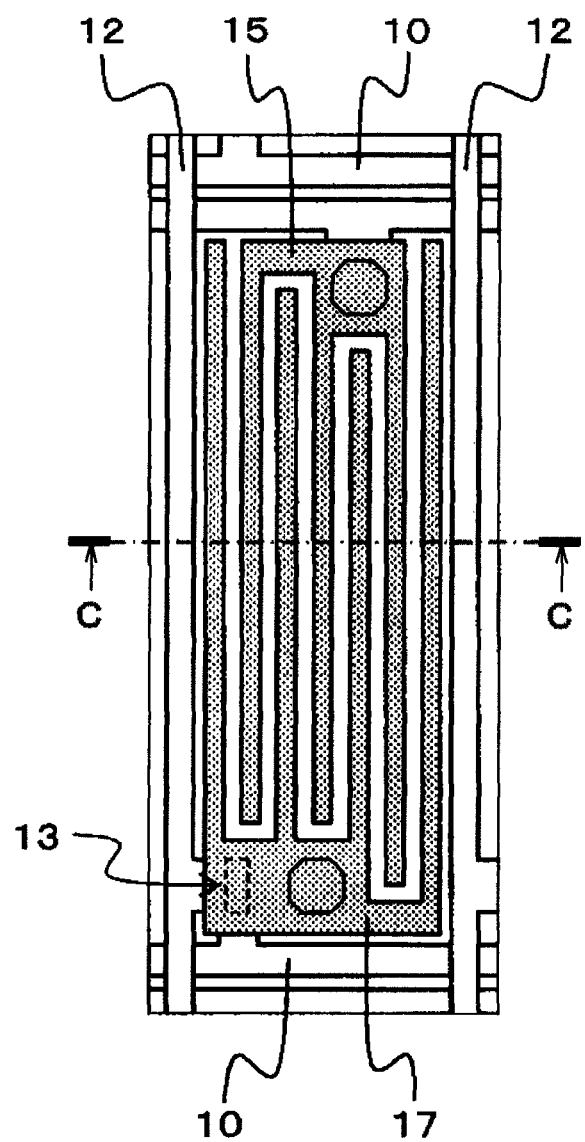
FIG. 19 is a schematic plan view illustrating an example of another method of placing a pixel electrode and a common electrode.
Figure 20:
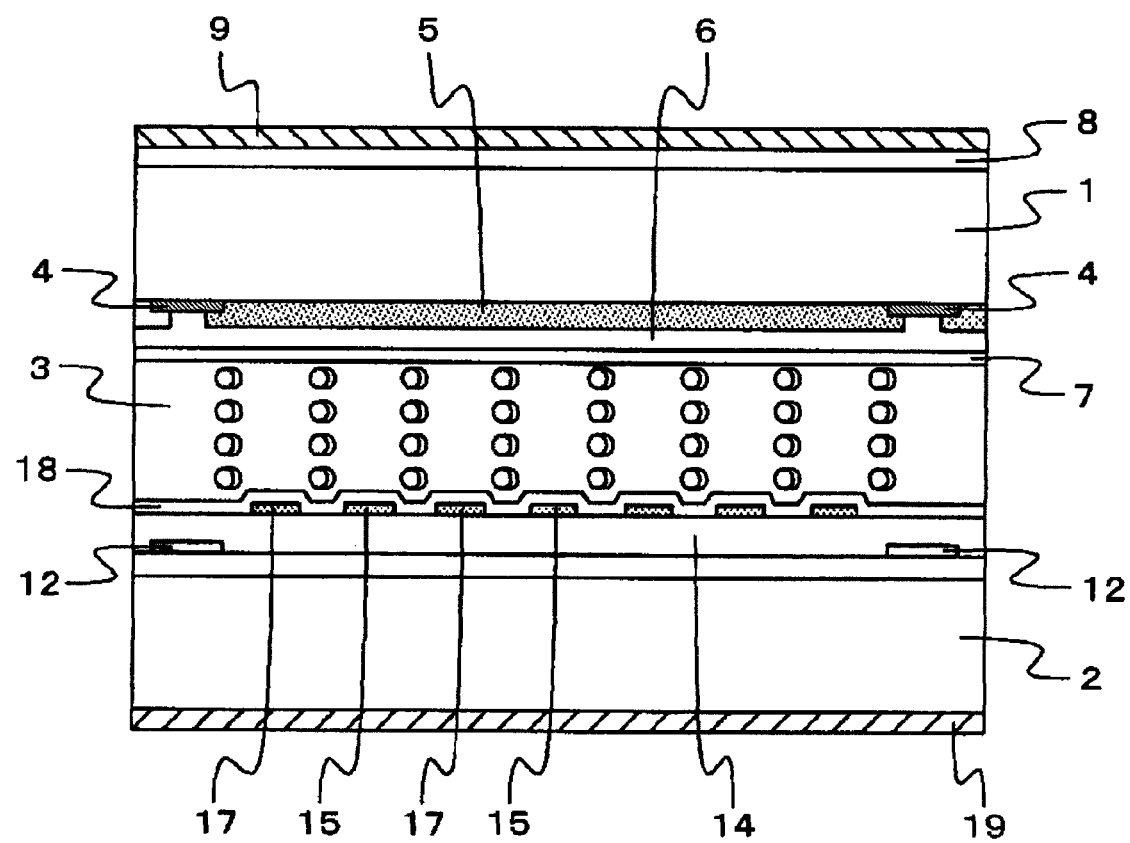
FIG. 20 is a schematic cross-sectional view illustrating an example of a cross-sectional configuration of a liquid crystal display panel taken along the line C-C of FIG. 19.
Figure 21:
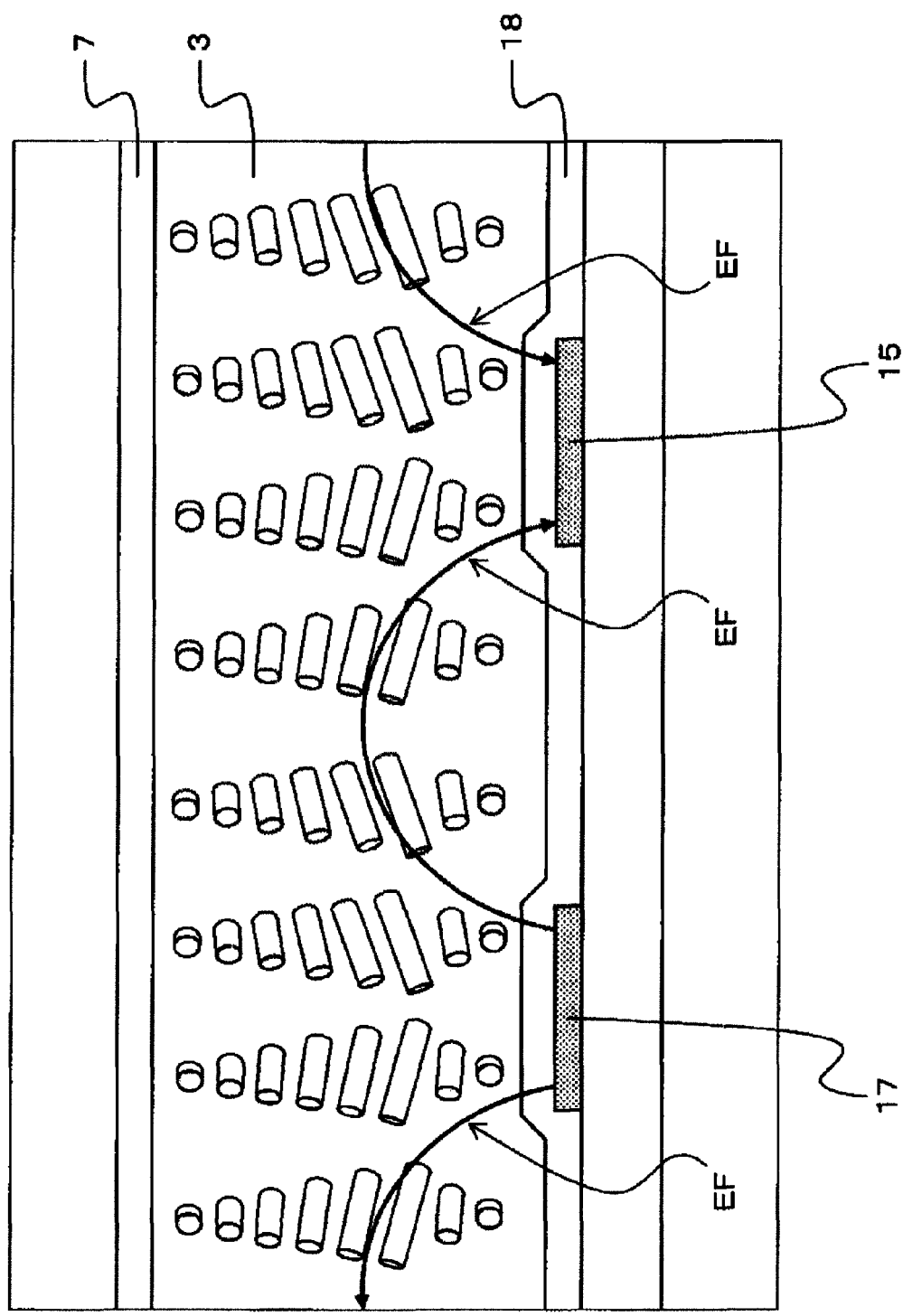
FIG. 21 is a schematic cross-sectional view illustrating an example of a change in alignment of liquid crystal molecules when an electric field is applied to the liquid crystal molecules.

FIGS. 19 to 21 are schematic views illustrating applied examples of Example 1.

FIG. 19 is a schematic plan view illustrating an example of another method of placing a pixel electrode and a common electrode. FIG. 20 is a schematic cross-sectional view illustrating an example of a cross-sectional configuration of a liquid crystal display panel taken along the line C-C of FIG. 19. FIG. 21 is a schematic cross-sectional view illustrating an example of a change in alignment of liquid crystal molecules when an electric field is applied to the liquid crystal molecules.

Example 1 describes a method of decreasing the flicker intensity IFL by reducing the transmittance fluctuation rate TPP in a plane in the IPS-Pro liquid crystal display panel in which an interdigital pixel electrode and a plate-shaped common electrode are laminated via the third insulating layer, as illustrated in FIGS. 1 to 3.

However, the IPS liquid crystal display panel also has an advance super-IPS (AS-IPS) system as illustrated in FIGS. 19 and 20. Here, in the AS-IPS liquid crystal display panel, both a pixel electrode and a common electrode are interdigital and are placed on the same plane of the second insulating layer. At this time, when the teeth of the pixel electrode 17 and the teeth of the common electrode 15 are arranged alternately in an extending direction of the scan line 10, the line of electric force EF has an arc shape as illustrated in FIG. 21 when a positive voltage is applied to the pixel electrode 17.

In the case of the IPS-Pro liquid crystal display panel, only the teeth of the pixel electrode 17 are arranged on the third insulating layer 16, and two fringe electric fields are generated between two adjacent teeth. In contrast, in the case of the AS-IPS liquid crystal display panel, the teeth of the pixel electrode 17 and the teeth of the common electrode 15 are arranged alternately on the second insulating layer 14, and one fringe electric field is generated between two adjacent teeth. Therefore, in the case of the AS-IPS liquid crystal display panel, assuming that the total number of teeth of the pixel electrode 17 and the common electrode 15 formed on the second insulating layer 14 is u, the relationship of the transmittance fluctuation rates TPP1 and TPP2 corresponding to Mathematical Equations 2 and 3 are respectively rewritten as expressed by the following Mathematical Equations 2' and 3'.

$$TPP1 \leq 81 \times \log_e(2u) - 44 \qquad (2')$$

$$TPP2 \leq 20 \times \log_e(2u) + 7 \qquad (3')$$

EXAMPLE 2

In order to decrease the flicker intensity remaining in the IPS-Pro liquid crystal display panel, in a liquid crystal display device according to Example 2, the dielectric anisotropy $\Delta\in$ of the liquid crystal layer 3 is changed in accordance with the number of teeth u of the pixel electrode 17, to thereby suppress the fluctuation of the transmittance TP attributed to the flexoelectric effect.

The liquid crystal display panel of the liquid crystal display device according to Example 2 includes pixels having a configuration as illustrated in FIGS. 1 to 3, and the other configurations than that of the liquid crystal layer 3 are the same as those of the conventional liquid crystal display panel.

FIGS. 22 to 25 are schematic views illustrating a schematic configuration of a liquid crystal display panel of the liquid crystal display device according to Example 2 of the present invention.

Figure 22:
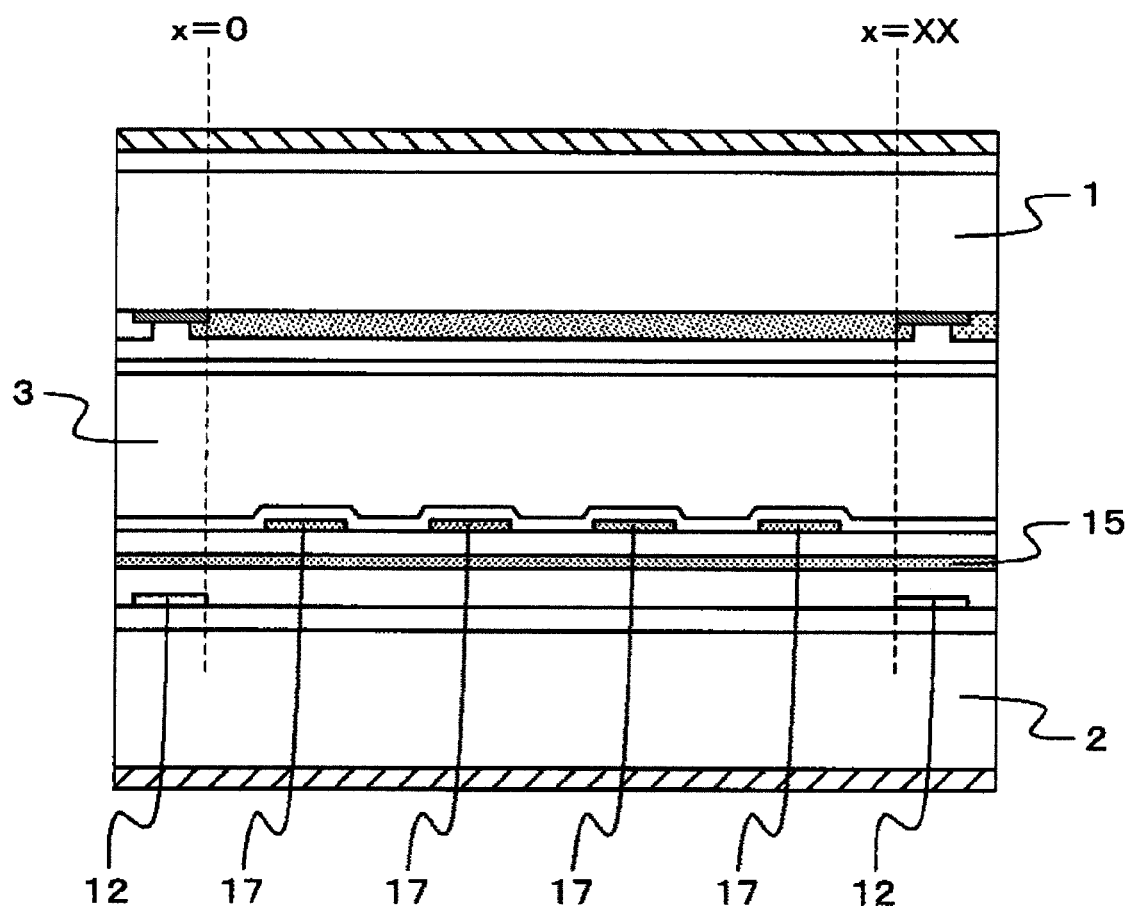
FIG. 22 is a schematic cross-sectional view illustrating an example of a cross-sectional configuration in a liquid crystal display panel of a liquid crystal display device according to Example 2 of the present invention.
Figure 23A:
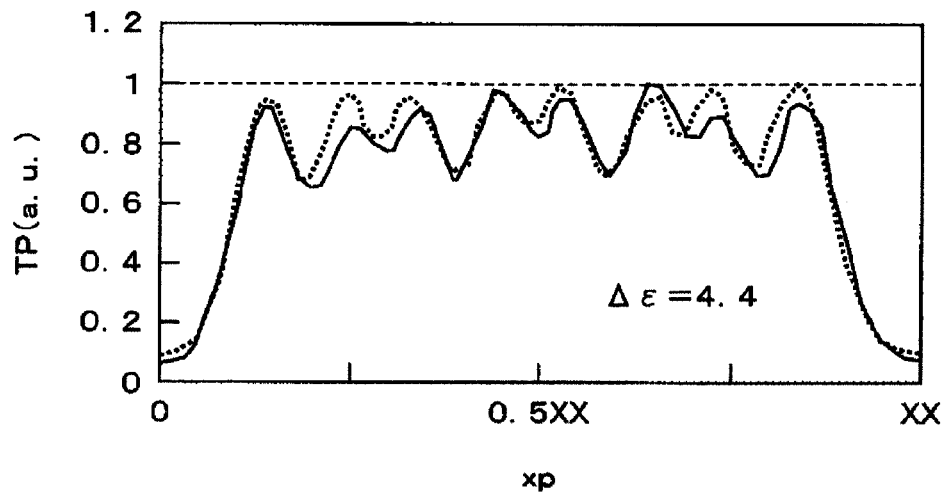
FIG. 23A is a schematic view illustrating an example of a relationship between dielectric anisotropy and an in-plane distribution of a transmittance of a liquid crystal layer in the liquid crystal display panel with the configuration illustrated in FIG. 22.
Figure 23B:
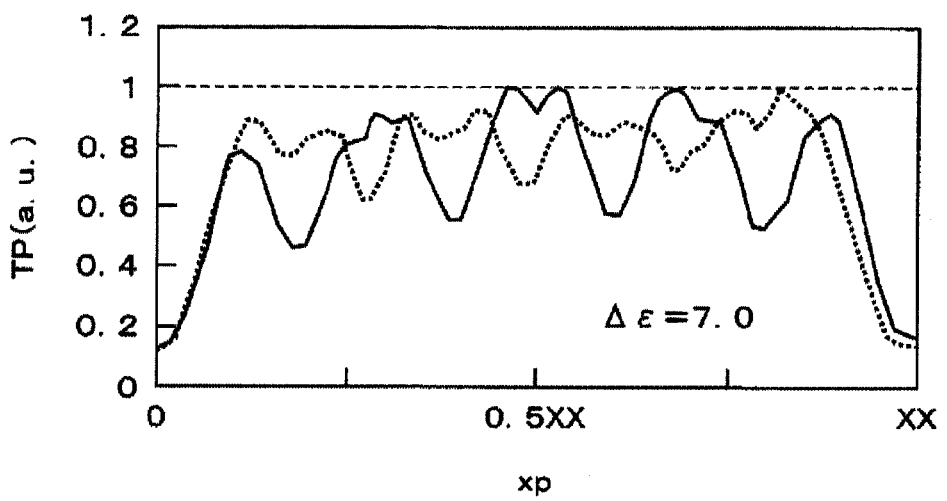
FIG. 23B is a schematic view illustrating another example of the relationship between dielectric anisotropy and an in-plane distribution of a transmittance of the liquid crystal layer in the liquid crystal display panel with the configuration illustrated in FIG. 22.
Figure 23C:
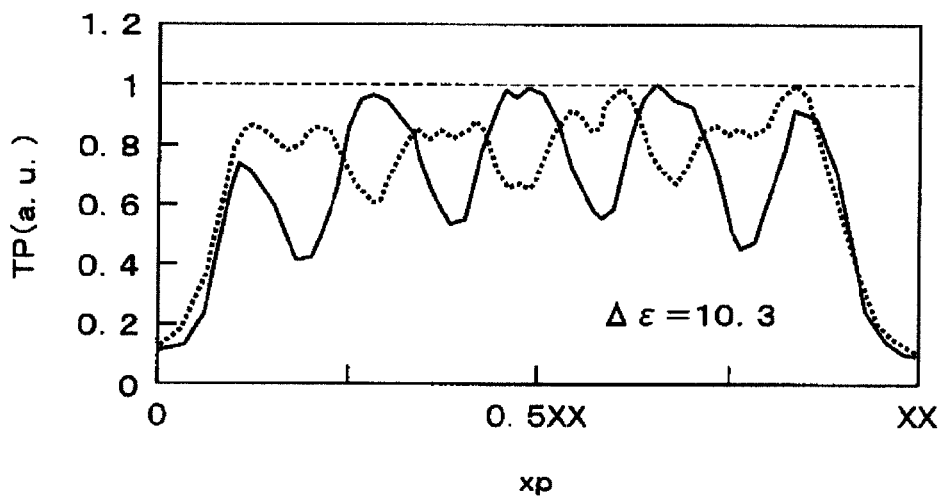
FIG. 23C is a schematic view illustrating still another example of the relationship between dielectric anisotropy and an in-plane distribution of a transmittance of the liquid crystal layer in the liquid crystal display panel with the configuration illustrated in FIG. 22.
Figure 24:
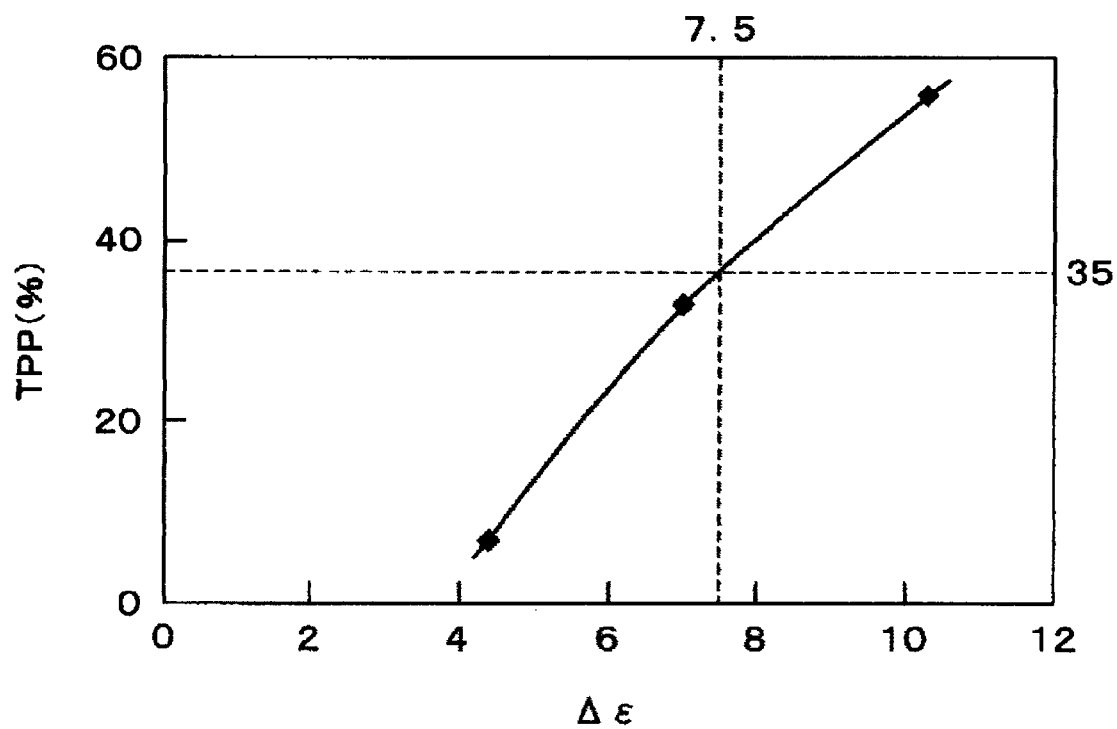
FIG. 24 is a schematic view illustrating a relationship between the dielectric anisotropy and a transmittance fluctuation rate of a liquid crystal layer on a gap of teeth of the pixel electrode.
Figure 25:
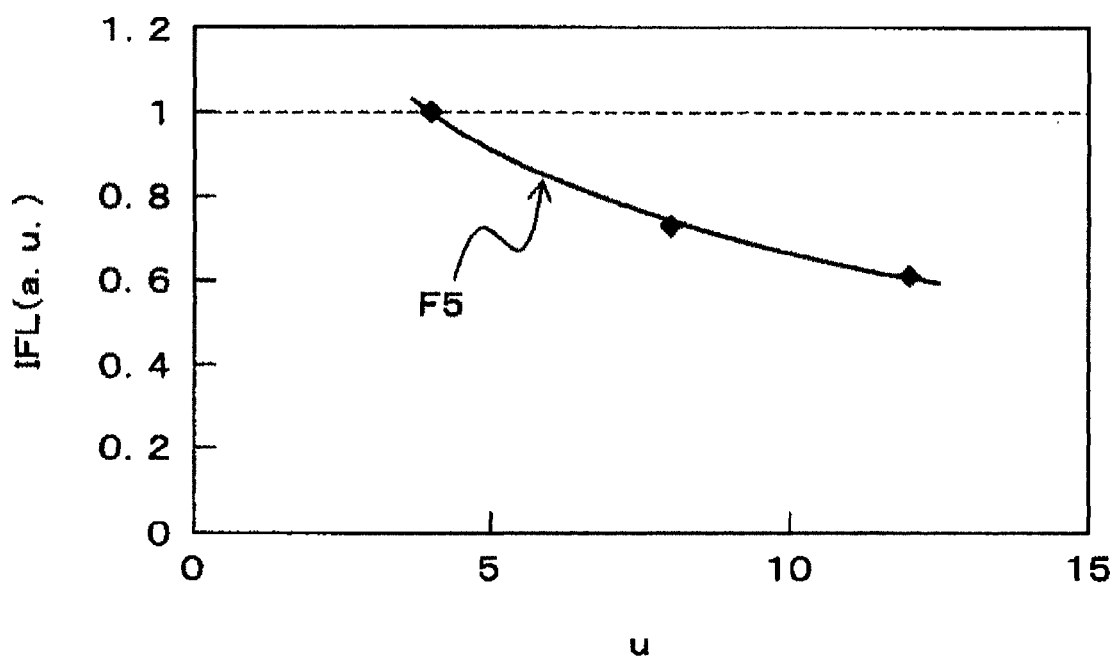
FIG. 25 is a schematic view illustrating an example of a relationship between the number of teeth of the pixel electrode and the flicker intensity.

FIG. 22 is a schematic cross-sectional view illustrating an example of a cross-sectional configuration of the liquid crystal display panel of the liquid crystal display device according to Example 2 of the present invention. FIGS. 23A to 23C are schematic views illustrating an example of a relationship between the dielectric anisotropy and the in-plane distribution of a transmittance of the liquid crystal layer in the liquid crystal display panel with the configuration illustrated in FIG. 22. FIG. 24 is a schematic view illustrating a relationship between the dielectric anisotropy and the transmittance fluctuation rate of the liquid crystal layer on a gap of the teeth of the pixel electrode. FIG. 25 is a schematic view illustrating an example of a relationship between the number of teeth of the pixel electrode and the flicker intensity.

In the IPS-Pro liquid crystal display panel, for example, in the case where the number of teeth u of the pixel electrode 17 is four as illustrated in FIG. 22, the relationship between the in-plane distribution of the transmittance TP from x=0 to x=XX and the dielectric anisotropy $\Delta\in$ of the liquid crystal layer 3 is investigated, and the results as illustrated in FIGS. 23A to 23C are obtained, for example. FIGS. 23A, 23B, and 23C are respectively graphs in which a horizontal axis represents a position xp in a section from x=0 to x=XX in FIG. 22 and a vertical axis represents a relative value of the transmittance TP. FIGS. 23A, 23B, and 23C respectively illustrate an in-plane distribution of the transmittance TP when the dielectric anisotropy $\Delta\in$ of the liquid crystal layer 3 is 4.4, 7.0, and 10.3. Further, in the respective FIGS. 23A, 23B, and 23C, a solid line represents an in-plane distribution in the case where a positive voltage is applied to the pixel electrode 17, and a dotted line represents an in-plane distribution when a negative voltage is applied to the pixel electrode.

As illustrated in FIGS. 23A to 23C, as the dielectric anisotropy $\Delta\in$ increases, the difference between the in-plane distribution of the transmittance TP in the case where a positive voltage is applied to the pixel electrode 17 and the in-plane distribution of the transmittance TP in the case where a negative voltage is applied to the pixel electrode 17 increases, and the transmittance fluctuation rate in a plane also increases.

At this time, when the relationship between the transmittance fluctuation rate in a plane and the dielectric anisotropy on a gap of the teeth is investigated from FIGS. 23A to 23C, for example, a relationship illustrated in FIG. 24 is obtained. FIG. 24 is a graph in which a horizontal axis represents a dielectric anisotropy $\Delta\in$ and a vertical axis represents a transmittance fluctuation rate TPP (%).

In order to set the flicker intensity, for example, on a gap portion at 10 or less in the liquid crystal display panel in which the number of teeth of the pixel electrode 17 is four, it is necessary that the transmittance fluctuation rate TPP is set at 35% or less from Mathematical Equation 3. Thus, in the case where there is the relationship illustrated in FIG. 24 between the dielectric anisotropy $\Delta\in$ of the liquid crystal layer 3 and the transmittance fluctuation rate TPP, the flicker intensity can be set at 1% or less if the dielectric anisotropy $\Delta\in$ of the liquid crystal layer 3 is 7.5 or less. The reason why the flicker intensity can be reduced by decreasing the dielectric anisotropy $\Delta\in$ of the liquid crystal layer 3 is that the polarizability of liquid crystal molecules is decreased by decreasing the dielectric anisotropy $\Delta\in$ and the flexoelectric coefficients $e_{11}$ and $e_{33}$ become small as described above.

Further, the flicker intensity IFL depends upon the number of teeth u of the pixel electrode 17, and as the number of teeth u becomes larger, the flicker intensity IFL decreases. The inventors of this application investigated the relationship between the number of teeth u of the pixel electrode 17 and the flicker intensity when a predetermined AC voltage (for example, ±5 V) was applied to the pixel electrode 17 in the IPS-Pro liquid crystal display panel, and the results illustrated in FIG. 25 were obtained. FIG. 25 is a graph in which a horizontal axis represents the number of teeth u of the pixel electrode 17 and a vertical axis represents the flicker intensity IFL. Further, FIG. 25 illustrates measurement results of the flicker intensity in the case where the number of teeth u is 4, 8, and 12, and a regression curve F5 obtained from those results. Further, in FIG. 25, the flicker intensity in the case where the number of teeth u is four is set at 1.

The regression curve F5 illustrated in FIG. 25 represents the relationship between the number of teeth u of the pixel electrode 17 and the flicker intensity IFL, and the following Mathematical Equation 8 represents the flicker intensity ratio PFL when the number of teeth is u assuming that the flicker intensity in the case where the number of teeth is 4 is set at 1.

$$PFL = F5 = -0.36 \times \log_e(u) + 1.49 \quad (8)$$

Further, in the case where the number of teeth is four, the dielectric anisotropy $\Delta\in$ at which the flicker intensity becomes 1% is 7.5. Thus, in the case where the number of teeth is u, the value $PFL_{max}$ of the dielectric anisotropy $\Delta\in$ at which the flicker intensity becomes 1% is expressed by the following Mathematical Equation 9.

$$PFL_{max} = \frac{7.5}{-0.36 \times \log_e(u) + 1.49} \quad (9)$$

More specifically, in the case where the number of teeth of the pixel electrode is u, if the liquid crystal layer 3 is formed using a liquid crystal material in which the dielectric anisotropy $\Delta\in$ is smaller than the value $PFL_{max}$ obtained from Mathematical Equation 9 ($\Delta\in \leq PFL_{max}$), the flicker intensity can be set within 1%.

Further, in the case where the dielectric anisotropy $\Delta\in$ is negative, liquid crystal molecules do not rise even when an electric field is applied, and hence splay deformation or bend deformation does not occur. Therefore, in the case where the dielectric anisotropy $\Delta\in$ is negative, the flexoelectric polarization is also small.

As described above, in the liquid crystal display device according to Example 2, the flexoelectric coefficients $e_{11}$ and $e_{33}$ can be decreased by decreasing the dielectric anisotropy $\Delta\in$ of the liquid crystal layer 3 in accordance with the number of teeth u of the pixel electrode. Therefore, in the IPS-Pro liquid crystal display device, the remaining flicker intensity IFL can be decreased even when an optimum DC offset voltage is applied.

Further, in the liquid crystal display device according to Example 2, the IPS-Pro liquid crystal display device is exemplified. However, the present invention is not limited thereto, and the flicker intensity can be decreased easily by decreasing the dielectric anisotropy $\Delta\in$ of the liquid crystal layer 3 even in the AS-IPS liquid crystal display device.

In the case of the AS-IPS liquid crystal display device, as described above, one fringe electric field is generated between two adjacent teeth (the tooth of the pixel electrode 17 and the tooth of the common electrode 15). Therefore, in the case of the AS-IPS liquid crystal display panel, assuming that the total number of teeth of the pixel electrode 17 and the common electrode 15 formed on the insulating layer is u, the value $PFL_{max}$ of the dielectric anisotropy $\Delta\in$ corresponding to Mathematical Equation 8 is rewritten as the following Mathematical Equation 9'.

$$PFL_{max} = \frac{7.5}{-0.36 \times \log_e(2u) + 1.49} \quad (9')$$

EXAMPLE 3

In the liquid crystal display device according to Examples 1 and 2, the flicker intensity is decreased by decreasing the flexoelectric coefficients $e_{11}$ and $e_{33}$ of the liquid crystal layer 3. In contrast, in the liquid crystal display device according to Example 3, the flexoelectric polarization is weakened by alleviating the acute electric field distribution to decrease the flicker intensity.

Figure 26:
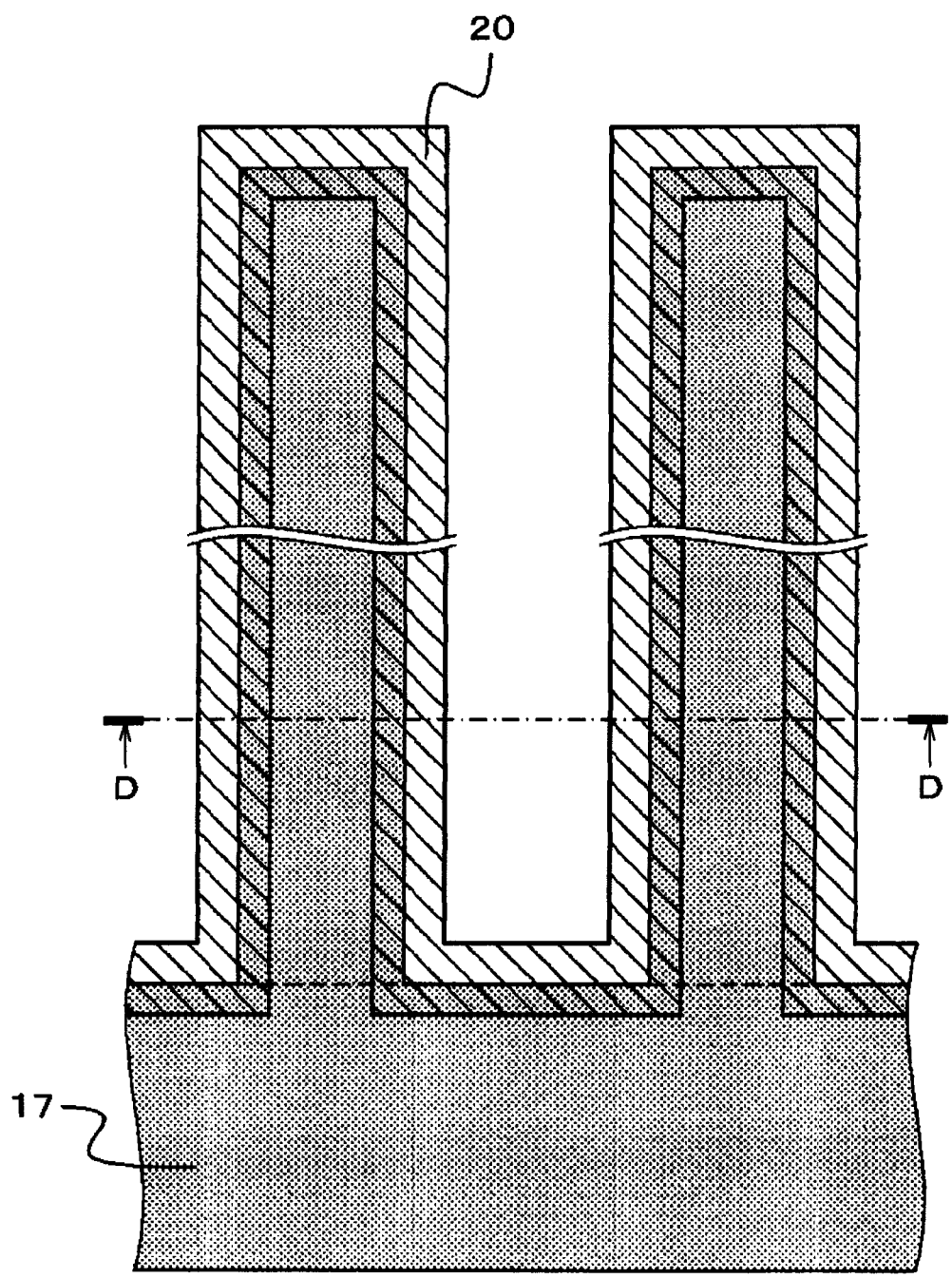
FIG. 26 is a schematic plan view illustrating an example of a plane configuration of a main portion in a liquid crystal display panel of a liquid crystal display device according to Example 3 of the present invention.
Figure 27:
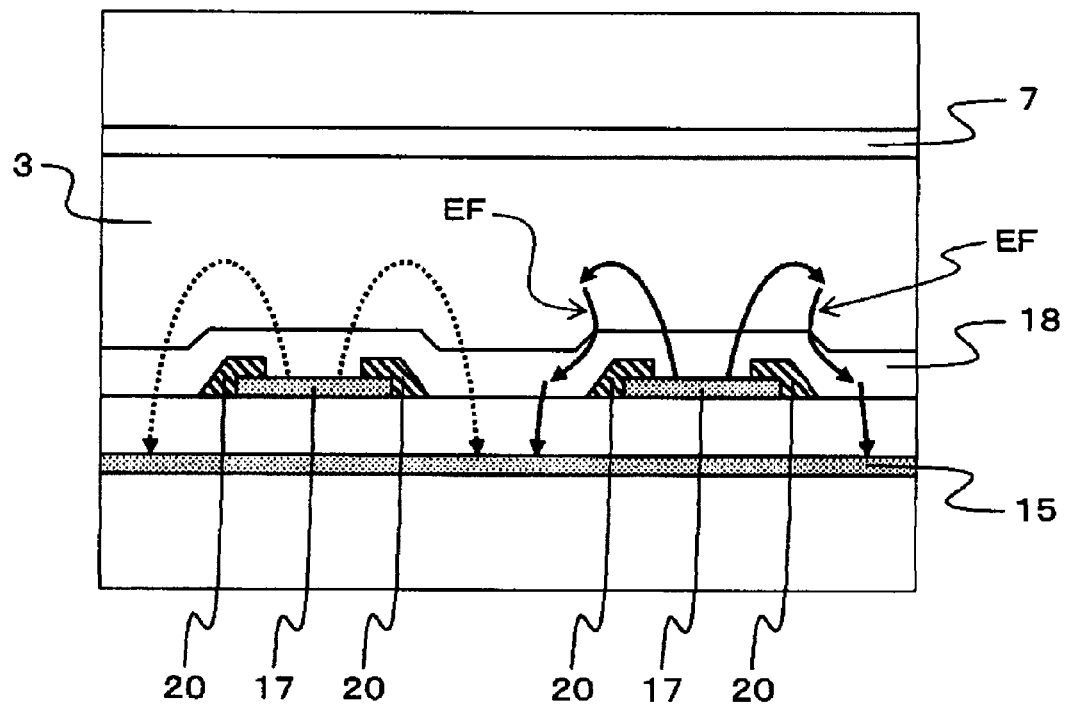
FIG. 27 is a schematic cross-sectional view illustrating an example of a cross-sectional configuration of a main portion of a liquid crystal display panel taken along the line D-D of FIG. 26.

FIGS. 26 to 27 are schematic views illustrating a schematic configuration of a liquid crystal display panel according to Example 3 of the present invention.

FIG. 26 is a schematic plan view illustrating an example of a plane configuration of a main portion of the liquid crystal display panel of the liquid crystal display device according to Example 3 of the present invention. FIG. 27 is a schematic cross-sectional view illustrating an example of a cross-sectional configuration of a main portion of the liquid crystal display device taken along the line D-D of FIG. 26.

In the liquid crystal display panel according to Example 3, in order to alleviate the acute electric field distribution, for example, as illustrated in FIGS. 26 and 27, the dielectric cap 20 is placed on the outer periphery of the pixel electrode 17.

The dielectric cap 20 is formed of a dielectric (insulator) having a permittivity lower than that of the liquid crystal layer 3. Further, the dielectric cap 20 is placed only in an edge portion of the tooth of the pixel electrode 17, and is not formed in the vicinity of the center of the tooth portion or the vicinity of the center of a gap portion of the teeth. Further, the liquid crystal display panel according to Example 3 has the same configuration as that of the conventional liquid crystal display panel, for example, except that the dielectric cap 20 is provided in the liquid crystal display panel with the configuration illustrated in FIGS. 1 to 3.

Thus, an electric field (electric line of force EF) generated when a positive voltage is applied to the pixel electrode 17 has a distribution indicated by an arrow of a solid line in FIG. 27. On the other hand, an electric field in the case where the dielectric cap 20 is not provided has a distribution indicated by an arrow of a dotted line in FIG. 27. More specifically, in the liquid crystal display panel in which the dielectric cap 20 is provided, an electric field in the vicinity of an edge of the tooth of the pixel electrode 17 is distorted, and an electric field component in the direction normal to a substrate surface is weakened.

Further, although not illustrated, an electric field (electric line of force EF) generated when a negative voltage is applied to the pixel electrode 17 merely has the direction of an arrow of the electric line of force EF illustrated in FIG. 27 inverted.

When an electric field component in a normal direction is weakened due to the presence of the dielectric cap 20, splay deformation and bend deformation are suppressed. A flexoelectric polarization occurs when liquid crystal is subjected to splay deformation or bend deformation. Therefore, the flexoelectric polarization is reduced and an in-plane transmittance fluctuation rate is decreased by suppressing splay deformation and bend deformation. Thus, in the liquid crystal display panel according to Example 3, a fluctuation in transmittance attributed to a flexoelectric effect can be suppressed, and the flicker intensity can be decreased in the same way as in the liquid crystal display panel according to Examples 1 and 2.

In order to form the dielectric cap 20, for example, an organic film having a relative permittivity can be used, such as an organic resist. The dielectric cap 20 can be formed of any material that has a permittivity lower than that of a liquid crystal material and is a dielectric, without being limited to the organic film.

Further, in order to reduce the flicker intensity by the dielectric cap 20, as illustrated in FIGS. 26 and 27, it is necessary that the dielectric cap 20 is placed only in an edge portion of the tooth of the pixel electrode 17, and is not placed in the vicinity of the center of a tooth portion and the vicinity of the center of a gap portion of the teeth. At this time, an area in which the teeth of the pixel electrode 17 and the dielectric cap 20 overlap each other in a plane as illustrated in FIG. 26 is set at 10% to less than 90% with respect the area of the teeth.

As described above, according to the liquid crystal display device of Example 3, a flexoelectric polarization is decreased and the flicker intensity can be decreased easily, by providing the dielectric cap 20.

Further, in the liquid crystal display device according to Example 3, for example, the same liquid crystal material as that of the conventional general IPS-Pro liquid crystal display device can be used for the liquid crystal layer 3. Therefore, in the liquid crystal display device according to Example 3, the flicker intensity can be decreased further more easily compared with that of the liquid crystal display devices according to Examples 1 and 2.

EXAMPLE 4

In a liquid crystal display device according to Example 4, in order to decrease the flicker intensity remaining in the IPS-Pro liquid crystal display panel, a polar anchoring strength at an interface between the liquid crystal layer 3 and the first alignment film 7 is reduced, and hence a fluctuation in the transmittance TP attributed to the flexoelectric effect is suppressed. Here, the polar anchoring strength is a parameter indicating to which degree liquid crystal molecules are fixed to the interface with another material such as the first alignment film 7. As the polar anchoring strength becomes larger, liquid crystal molecules become more strongly fixed to an interface.

In the case of weakening the polar anchoring strength at an interface with the first alignment film 7, the first alignment film 7 is likely to rotate further in a polar angle direction, compared with the case where the polar anchoring strength is strong. Flexoelectric polarization occurs when splay deformation or bend deformation is generated. Therefore, if the liquid crystal alignment on the first alignment film side rotates in a polar angle direction easily, acute splaying deformation and bend deformation are reduced. More specifically, when the polar anchoring strength at the interface with the first alignment film 7 is weakened, for example, the tilt of the liquid crystal molecules in a region BL2 illustrated in FIG. 9 becomes large. Consequently, it is considered that the splay deformation in the region BL1 is relatively alleviated, and the flexoelectric polarization becomes small, and the flicker intensity is decreased.

In order to weaken the polar anchoring strength, for example, the rubbing strength of the first alignment film 7 can be set to be smaller than the rubbing strength of the second alignment film 18. Further, the polar anchoring strength can be reduced easily also by selecting a material to be used for forming the first alignment film 7.

As described above, in the liquid crystal display device according to Example 4, the polar anchoring strength of the first alignment film 7 at a position far away from the pixel electrode 17 and the common electrode 15 is set to be smaller than the polar anchoring strength of the second alignment film 18 at a position close to the pixel electrode 17 and the common electrode 15, and hence the flicker intensity can be decreased easily.

Further, in the liquid crystal display device according to Example 4, a liquid crystal material used for the conventional general IPS liquid crystal display device can be for the liquid crystal layer 3. Therefore, in the liquid crystal display device according to Example 4, the flicker intensity can be decreased further more easily compared with that of the liquid crystal display devices according to Examples 1 and 2.

Further, in the liquid crystal display device according to Example 4, the alignment deformation of liquid crystal can be performed easily, and hence the enhancement of a transmittance can be expected.

EXAMPLE 5

In a liquid crystal display device according to Example 5, due to the relationship between a width L of the tooth of the pixel electrode 17 and a size S of a gap, a transmittance fluctuation rate is small to such a degree that the transmittance fluctuation rate may not be observed as flicker. More specifically, in the liquid crystal display device according to Example 5, for example, by optimizing the relationship between the width L of the tooth of the pixel electrode illustrated in FIG. 11 and the size S of a gap, an in-plane transmittance fluctuation rate becomes small to such a degree that the transmittance fluctuation rate may not be observed as flicker.

Figure 28:
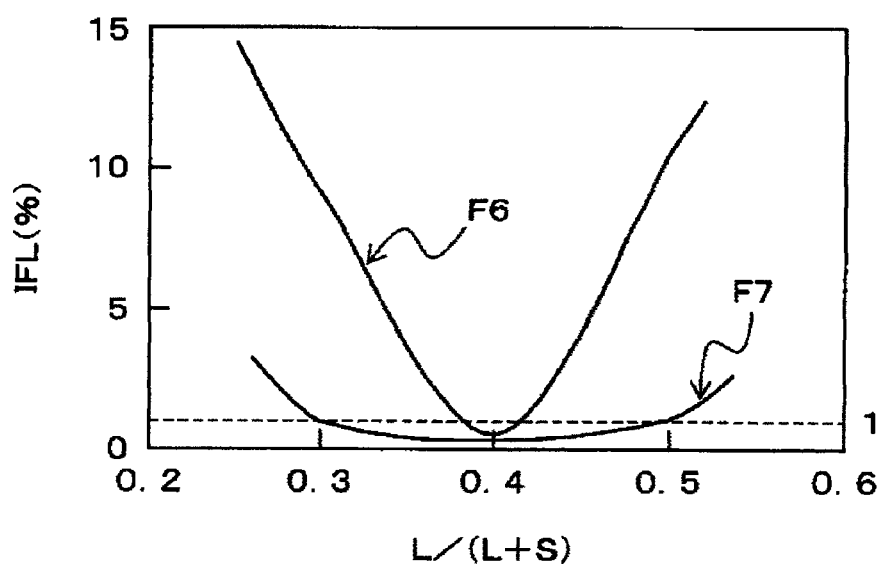
FIG. 28 is a schematic view illustrating a functional effect of a liquid crystal display device according to Example 5 of the present invention.

FIG. 28 is a schematic view illustrating a functional effect of the liquid crystal display device according to Example 5 of the present invention.

In order to optimize the relationship between the width L of the tooth of the pixel electrode and the size S of the gap, the inventors of this application conducted simulation regarding the relationship between L/(L+S) and the flicker intensity IFL assuming that the teeth of the pixel electrode 17 are arranged infinitely. FIG. 28 illustrates the simulation results. FIG. 28 is a graph illustrating the relationship between L/(L+S) and the flicker intensity IFL when an AC voltage with a rectangular wave of ±5 V and 30 Hz is applied to the pixel electrode. Further, in FIG. 28, a curve F6 represents simulation results assuming that the flexoelectric coefficient is set at $e_{11}=e_{33}-10$ pC/m, and a curve F7 represents simulation results assuming that the flexoelectric coefficient is set at a small value that satisfies Mathematical Equations 2 and 3.

As is understood from FIG. 28, even in the case where the flexoelectric coefficient is any value, when L/(L+S) is about 0.4, the flicker intensity IFL takes a minimum value. The reason for this is considered as follows. When L/(L+S) is set at about 0.4, the distribution of an in-plane transmittance becomes substantially equal between the case where a positive voltage is applied to the pixel electrode 17 and the case where a negative voltage is applied to the pixel electrode 17, and a transmittance fluctuation rate becomes small.

Further, in the case where the liquid crystal layer 3 is formed using a liquid crystal material having a small flexoelectric coefficient that satisfies Mathematical Equations 2 and 3, the optimum width of L/(L+S) becomes large, and the flicker intensity IFL becomes 1% or less when $0.3 \leq L/(L+S) \leq 0.5$, which may not be observed as flicker.

Thus, in the liquid crystal display device according to Example 5, by setting the relationship between the width L of the pixel electrode and the gap S of the teeth to be L/(L+S)≈0.4, the flicker intensity can be decreased.

Further, when the liquid crystal layer 3 is formed using a liquid crystal material with a small flexoelectric coefficient as described in Examples 1 and 2, the degree of freedom of the relationship between the width L of the pixel electrode and the gap S of the teeth becomes high, which enables easily decreasing the flicker intensity.

The present invention has been described specifically based on the above-mentioned examples. The present invention is not limited to the above-mentioned examples, and needless to say, various modifications can be made without departing from the spirit and scope of the present invention.

For example, in the IPS-Pro liquid crystal panel described in the above-mentioned examples, the reverse electrode 8 is provided between the first substrate 1 and the first polarization plate 9. However, the present invention is not limited thereto, and the reverse electrode 8 may not be present.

Further, the configurations described in Examples 1 to 3 and Example 5 can also be applied to the IPS-Pro liquid crystal display panel without the first alignment film 7 and the second alignment film 18, for example.

Further, in the liquid crystal display panel described in the above-mentioned examples, the first substrate 1, the liquid crystal layer 3, and the second substrate 2 are placed between the first polarization plate 9 and the second polarization plate 19. However, the present invention is not limited thereto, and for example, the second polarization plate 19 may be placed between the liquid crystal layer 3 and the second substrate 2.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a first substrate;
   a second substrate;
   a liquid crystal layer sandwiched between the first substrate and the second substrate;
   a first polarization plate placed on a side opposite to a side of the first substrate on which the liquid crystal layer is placed;
   a second polarization plate placed on a side opposite to a side of the second substrate on which the liquid crystal layer is placed; and
   a pixel electrode and a common electrode which are provided on the side of the second substrate on which the liquid crystal layer is placed, wherein:
   one of the pixel electrode and the common electrode is interdigital in shape and the other of the pixel electrode and the common electrode is planar in shape;
   the liquid crystal layer has flexoelectric coefficients $e_{11}$ and $e_{33}$, both absolute values of which are +7 pC/m or less;
   the pixel electrode and the common electrode are laminated via an insulating layer;
   the one of the pixel electrode and the common electrode is closer to the liquid crystal layer than the other of the pixel electrode and the common electrode; and
   the liquid crystal display device further comprises a dielectric cap having a permittivity lower than a permittivity of the liquid crystal layer, the dielectric cap being formed between the liquid crystal layer and the one of the pixel electrode and the common electrode which is interdigital in shape so as to cover an outer peripheral portion of at least one tooth of the one of the pixel electrode and the common electrode and not to cover a center of a gap between adjacent teeth of the one of the pixel electrode and the common electrode.

2. The liquid crystal display device according to claim 1, wherein the liquid crystal layer has elastic constants $K_{11}$ and $K_{33}$, both of which are 13 pN or more.

3. The liquid crystal display device according to claim 1, wherein the liquid crystal layer has elastic constants $K_{11}$ and $K_{33}$, both of which are 16 pN or more.

4. The liquid crystal display device according to claim 1, wherein:
   the pixel electrode and the common electrode are laminated via an insulating layer;
   the one of the pixel electrode and the common electrode is closer to the liquid crystal layer than the other of the pixel electrode and the common electrode; and
   assuming that a number of teeth of the interdigital in shape of the one of the pixel electrode and the common electrode is u, the following relationship of Mathematical Equation 1 is satisfied between a positive dielectric anisotropy Δ∈ of the liquid crystal layer and the number of teeth u, $$\Delta\varepsilon \le \frac{7.5}{-0.36 \times \log_e(u) + 1.49}. \quad (1)$$

5. The liquid crystal display device according to claim 1, wherein one of the pixel electrode and the common electrode and the dielectric cap have an overlapped region with an area of 10% or more and less than 90% with respect to an area of the one of the pixel electrode and the common electrode.

* * * * *